United States Patent
Ronnewinkel et al.

(10) Patent No.: US 7,373,358 B2
(45) Date of Patent: May 13, 2008

(54) USER INTERFACE FOR MAINTAINING CATEGORIZATION SCHEMES

(75) Inventors: Christopher Ronnewinkel, Heidelberg (DE); Janaki Kumar, Palo Alto, CA (US); Michael Kuehn, Palo Alto, CA (US)

(73) Assignee: SAP Aktiengesellschaft, Waldorf (DE)

( * ) Notice: Subject to any disclaimer, the term of this patent is extended or adjusted under 35 U.S.C. 154(b) by 467 days.

(21) Appl. No.: 10/822,495

(22) Filed: Apr. 12, 2004

(65) Prior Publication Data

US 2005/0234959 A1    Oct. 20, 2005

(51) Int. Cl.
G06F 17/30    (2006.01)
G06F 17/00    (2006.01)

(52) U.S. Cl. .............. 707/102; 707/3; 707/10; 707/101

(58) Field of Classification Search ........ None
See application file for complete search history.

(56) References Cited

U.S. PATENT DOCUMENTS

| | | | |
|---|---|---|---|
| 5,752,025 A * | 5/1998 | Shakib et al. .............. 707/102 |
| 5,765,033 A | 6/1998 | Miloslavsky | |
| 5,793,861 A | 8/1998 | Haigh | |
| 5,895,466 A | 4/1999 | Goldberg et al. | |
| 6,055,540 A * | 4/2000 | Snow et al. .............. 707/103 R |
| 6,741,959 B1 | 5/2004 | Kaiser | |
| 6,810,394 B2 | 10/2004 | Coutts et al. | |
| 6,941,304 B2 * | 9/2005 | Gainey et al. .............. 707/10 |
| 7,185,008 B2 | 2/2007 | Kawatani | |
| 2001/0047377 A1 | 11/2001 | Sincaglia et al. | |
| 2002/0065836 A1 | 5/2002 | Sasaki | |
| 2002/0116641 A1 | 8/2002 | Mastrianni | |
| 2002/0133494 A1 | 9/2002 | Goedkin | |
| 2002/0198909 A1 * | 12/2002 | Huynh et al. .............. 707/513 |
| 2004/0006491 A1 * | 1/2004 | Brown et al. .............. 705/2 |
| 2004/0083191 A1 | 4/2004 | Ronnewinkel | |
| 2004/0260534 A1 * | 12/2004 | Pak et al. .............. 704/7 |

FOREIGN PATENT DOCUMENTS

| | | |
|---|---|---|
| EP | 1199855 | 4/2002 |
| EP | 1209617 | 5/2002 |
| JP | 2002/231520 | 8/2000 |

(Continued)

OTHER PUBLICATIONS

Product Description of Siebel eMail Response Value Proposition, obtained from www.siebel.com, printed from the Internet on Oct. 23, 2003, 6 pages.

(Continued)

*Primary Examiner*—Joon Hwan Hwang
(74) *Attorney, Agent, or Firm*—Fish & Richardson P.C.

(57) ABSTRACT

A graphical user interface (GUI) tool for maintaining categorization schemes includes a categorization area that displays user-input fields which may be used to define a number of categories and a number of links that form a categorization scheme. The categorization scheme is organized to enable the computer-executed process to categorize the data. The categorization causes the selection of categories that correspond to the data. The selection is made by making a category determination beginning at the top level and proceeding to the children of categories that correspond to the data.

9 Claims, 16 Drawing Sheets

FOREIGN PATENT DOCUMENTS

| | | |
|---|---|---|
| JP | 2001/297261 | 10/2001 |
| WO | 01/06435 | 1/2001 |
| WO | 02/080036 | 10/2002 |

OTHER PUBLICATIONS

E-Service With Advanced Workflow, obtained from http://www.realmarket.com/news/qlinktech040500.html, printed from the Internet on Apr. 7, 2004, 2 pages.

Product Description of SAP Basic Data (QM-PT-BD), obtained from www.help.sap.com, printed from the Internet on Mar. 24, 2004, 2 pages.

4.3.2 Case Based Reasoning, obtained at http://www.cs.mdx.ac.uk/staffpages/serengul/ML/hybrid.html—Printed from the Internet on Dec. 9, 2002, 2 pages.

Sebastiani, "Machine Learning in Automated Text Categorization," ACM Computing Surveys, 34:1, (2002) pp. 1-47.

Yang et al., "A re-examination of text categorization methods," School of Computer Science, Carnegie Mellon University, pp. 42-49.

Lesser et al., "BIG: An Agent for Resource-Bounded Information Gathering and Decision Making," Artificial Intelligence, 118 (2000), pp. 197-244.

Larkey et al, "Combining Classifiers in Text Categorization," Proceedings of the 19th Annual International ACM Sigir Conference on Research and Development in Information Retrieval, Zurich, Aug. 18-22, 1996 pp. 289-297.

* cited by examiner

FIG. 4

ERMS — 125

User Administration • Standard Responses • Categories • Repository • Templates • Rules Categories — 437
Show: My favorites — 436
Get: [ ] Go — 441    Add to Favorites — 442    Open Advanced Search — 490    Help Save — 435    Create Sub node    Change    Cut    Copy    Paste    Delete    Print
410

Name — 425 | Description — 430
--- | ---
▽ Categories — 135 | Root
▽ Interaction Reason — 170 | The reason for Customer Contacting LEGO
▷ LEGO Club — 160 | Refers to the exclusive Lego club; Category to address member questions & concerns
▷ LEGO Land — 210 | Enquires regarding the Lego Land
• Driving Directions | Enquires requesting driving directions
• Entry Fee — 190 | Requests to clarify entry fee
• Events — 200 | Request to know current events at Lego Land
▷ LEGO Products — 180 | Category enumerating the wide range of Lego products
▷ LEGO Org Chart — 445 | The organizational Chart of LEGO

1/5

Details — 450 | Query — 455 | Example Documents — 460 | Standard Responses — 465 | Knowledge Entities — 470

General — 420
Name: — 475    Driving Directions
Category ID: — 476    0201
Parent Category: — 477    Lego Land
Reason Code: — 478    Directions
Description: — 479    Enquires requesting Driving directions Creation Date:
Created By:
Last Modified Date:
Last Modified By:
Status:

400

ERMS

User Administration • Standard Responses • Categories • Repository • Templates • Rules

Categories

Show: My favorites | Get: | Change | | Go | | Help
--- | --- | --- | --- | --- | --- | ---
| | | | | Open Advanced Search Save | Create Sub node | Cut | Copy | Paste | Delete | Print | Add to Favorites

| | Name | Description |
|---|---|---|
| | ▷ Categories | Root |
| | ▽ Interaction Reason | The reason for Customer Contacting LEGO |
| | ▷ LEGO Club | Refers to the exclusive Lego club; Category to address member questions & concerns |
| | ▽ LEGO Land | Enquiries regarding the Lego Land |
| | • Driving Directions | Enquiries requesting driving directions |
| | • Entry Fee | Requests to clarify entry fee |
| | • Events | Request to know current events at Lego Land |
| | ▷ LEGO Products | Category enumerating the wide range of Lego products |
| | ▷ LEGO Org Chart | The organizational Chart of LEGO |

1/5

Details | Query | Example Documents | Standard Responses | Knowledge Entities Add Entry | Delete Entry

| | Form Name | Description | Language | Created By | Date | Form Usage | Text Type |
|---|---|---|---|---|---|---|---|
| | Directions - LEGOLAND Billund | Directions | EN | chavez | 09.10.2003 | Internet Mail (SMTP) | HTML |
| | Directions - LEGOLAND California | Directions | EN | chavez | 09.10.2003 | Internet Mail (SMTP) | HTML |
| | Directions - LEGOLAND Deutschland | Directions | EN | chavez | 09.10.2003 | Internet Mail (SMTP) | HTML |
| | Directions - LEGOLAND Windsor | Directions | EN | chavez | 09.10.2003 | Internet Mail (SMTP) | HTML |

1/2

Response Preview

LEGO

Hi <<Customer Name>>,
Here are the directions:
LEGOLAND®California is located in the seaside village of Carlsbad, just 30 minutes north of San Diego and one hour south of Anaheim.
From North San Diego County:
Take Coastal 5 South to Cannon Road East, and follow signs to LEGOLAND
From North San Diego County Inland:

ERMS

User Administration • Standard Responses • Categories • Repository • Templates • Rules

Categories

Show: [My favorites ▾]  Get: [ ▾ ]  [ ]  [Go]  [Open Advanced Search]  Help

[Save] [Create Sub node] [Change] [Cut] [Copy] [Paste] [Delete] [Print] [Add to Favorites]   1/5

| | Name | Description |
|---|---|---|
| ☐ | ▽ Categories | Root |
| ☐ | ▷ Interaction Reason | The reason for Customer Contacting LEGO |
| ☐ | ▷ LEGO Club | Refers to the exclusive Lego club; Category to address member questions & concerns |
| ☐ | ▽ LEGO Land | Enquiries regarding the Lego Land |
| ☐ | • Driving Directions | Enquiries requesting driving directions |
| ☐ | • Entry Fee | Requests to clarify entry fee |
| ☐ | • Events | Request to know current events at Lego Land |
| ☐ | ▷ LEGO Products | Category enumerating the wide range of Lego products |
| ☐ | ▷ LEGO Org Chart | The organizational Chart of LEGO |

— 410
— 135
— 420

Details

General — 1005

Name: [Interaction Reason]                Creation Date: [ ]
Category ID: [0201] — 1015              Created By: [ ]
Parent Category: [Category] — 1020      Last Modified Date: [ ]
Status: [ ]                              Last Modified By: [ ]
Description: [Reason for customer contacting LEGO]  Valid From: [ ]
                                         Valid To: [ ]

Application Area — 1010

☒ Interaction Record — 120
☒ More Responses — 1015
☒ Knowledge Search — 1020
☒ Rules Engine — 1025

FIG. 10

USER INTERFACE FOR MAINTAINING CATEGORIZATION SCHEMES

TECHNICAL FIELD

This invention relates to graphical user interfaces for defining categorization schemes that are used by computer-executed processes to categorize content.

BACKGROUND

This document describes the use of graphical user interfaces (GUIs) to develop categorization schemes that computer-executed processes can use to categorize information, especially information contained in electronic messages. Exemplary processes that use categorization schemes may be designed to be executed on enterprise computing systems. One such enterprise computing system involves software for performing business processes that include responding to large volumes of inbound communications from customers. Such inbound communications are typically in the form of email messages, but they may also include other forms of inbound data, such as information entered by a customer over the Internet directly into a form located on an enterprise's website.

The productivity of an individual agent who is responsible for responding to large volumes of inbound communications affects the cost of performing that particular business process. However, in controlling the cost, the quality of the responses should be maintained so that the customer is well served. Thus, systems used to respond to inbound communications should provide high quality responses in an efficient manner.

Systems that respond to high volumes of inbound emails may be called Email Response Management Systems (ERMS). By using an enterprise computing system to automate some of the steps of an ERMS, the process of responding to a large volume of inbound e-mails can be made more efficient and cost-effective. As such, an enterprise can use ERMS software to enhance productivity.

To realize maximum productivity gains in the run-time environment, an enterprise usually must first customize the ERMS software in the design-time environment. Specifically, the ERMS software must be configured to perform the particular business process steps required by a particular enterprise. In addition, the enterprise must be able to reconfigure the ERMS software to reflect changes in the enterprise's business process steps over time. Thus, an enterprise should be able to customize and to maintain ERMS software so that productivity gains can be maximized.

When an enterprise uses ERMS software to handle a large volume of inbound email messages, for example, it is important for the enterprise to quickly and accurately determine how to respond to received messages. For one message, an appropriate response may be to ship a product to a customer. For other messages, an appropriate response may be to provide a map of driving directions, or to contact a subject matter expert who can answer detailed technical questions. Accordingly, some ERMS systems make classification decisions to determine how to respond to each received message.

That classification decision can be partially or wholly automated by using computer-executed processes to rapidly review the received messages and to determine how each should be classified so that the enterprise can take appropriate steps to respond to each message. The classification decision may be used, for example, to retrieve stored information from a database. The stored information may then be automatically suggested to an agent who is responsible for responding to the message. Because the content of the message has already been classified, only stored information that has predefined associations to the content of the message are suggested to the agent. As such, the agent does not need to manually search for the stored information, which would take more of the agent's time. In enterprises in which an agent is responsible for responding to many hundreds of messages each day, reducing the time required for an agent to respond to each message can significantly improve productivity and reduce the overall cost of responding to received messages.

SUMMARY

This document describes a graphical user interface (GUI) tool for maintaining categorization schemes in enterprise computing systems. Categorization is used to automate the process of categorizing business documents and business objects. Categorization may be used to improve productivity achieved by enterprise computing software that performs steps in a business process (or in multiple business processes). In order to take full advantage of categorization, an enterprise needs a cost-effective tool for developing and maintaining categorization schemes.

In one aspect, a computer program product tangibly embodied in an information carrier includes instructions that, when executed, generate on a display device a GUI. The GUI is for editing a data structure to be used by a computer-executed process that categorizes data. The GUI includes a categorization area that displays user-input fields which may be used to define a number of categories and a number of links that form a categorization scheme. Each category corresponds to certain content associated with that category. Each category is defined to be at one of a series of levels between a top level and a bottom level. At each level below the top level, each category is linked by one of the number of defined links as a child category to a corresponding parent category. The parent category is one of the categories defined in the level immediately above the child category. Each child category corresponds to certain content that is a sub-set of the content that corresponds to the corresponding parent category. The categorization scheme is organized to enable the computer-executed process to categorize the data. The categorization causes the selection of categories that correspond to the data. The selection is made by making a category determination beginning at the top level and proceeding to the children of categories that correspond to the data.

In another aspect, a system for responding to a received message includes an information repository and a software program. The information repository includes a number of categories and a number of links that form a categorization scheme. Each category corresponds to certain content associated with that category, and each category is defined to be at one of a series of levels between a top level and a bottom level. Each category at a level below the top level is linked by one of the number of defined links as a child category to a corresponding parent category. The parent category is one of the categories defined in the level immediately above the child category. Each child category corresponds to certain content that is a sub-set of the content that corresponds to the corresponding parent category. The categorization scheme is organized to enable a categorization of the content of the received message. The categorization causes categories that correspond to the content of the received message to be selected. The selection is made by making a category determination beginning at the top level and proceeding to the children of categories that correspond to the content of the received message. The software program is tangibly embodied in an information carrier and includes instructions. When executed, these instructions categorize the content of the received message into at least one of the categories in the categorization scheme. Subsequent processing resulting from the received message depends on the categorization.

In another aspect, a method defines a data structure to be used by a computer-executed process to categorize content of a received message into at least one of a number of defined categories. The method includes a step of inputting categorization scheme information into user-input fields displayed in a categorization area of a GUI. The categorization scheme information includes a number of categories and a number of links. Each category corresponds to certain content associated with that category. Each category is defined to be at one of a series of levels between a top level and a bottom level. Each category at a level below the top level is linked by one of the number of defined links as a child category to a corresponding parent category. The parent category is one of the categories defined in the level immediately above the child category. Each child category corresponds to certain content that is a sub-set of the content that corresponds to the corresponding parent category. The categorization scheme is organized to enable the computer-executed process to categorize the content of the received message. The categorization causes categories that correspond to the content of the received message to be selected. This selection is made by making a category determination beginning at the top level and proceeding to the children of categories that correspond to the content of the received message.

In modifications, the method may further include the step of defining links using a linking area displayed in the GUI. These links define associations between categories defined in the categorization area and stored information. The computer-executed process, when executed, uses the stored information that is linked to the selected categories to perform subsequent processing of the received message.

In another aspect, a computer program product tangibly embodied in an information carrier includes instructions that, when executed, generate on a display device a GUI for editing a data structure to be used by a computer-executed process that categorizes content of a received message. The GUI includes a categorization area and a linking area. The categorization area displays user-input fields which may be used to define a number of categories and a number of links that form a categorization scheme. Each category corresponds to certain content associated with that category, and is defined to be at one of a series of levels between a top level and a bottom level. Each category at a level below the top level is linked by one of the number of defined links as a child category to a corresponding parent category. The parent category is one of the categories defined in the level immediately above the child category. Each child category corresponds to certain content that is a sub-set of the content that corresponds to the corresponding parent category. The categorization scheme is organized to enable the computer-executed process to categorize the content of the received message. This categorization causes categories that correspond to the content of the received message to be selected. This selection is made by making a category determination beginning at the top level and proceeding to the children of categories that correspond to the content of the received message. The linking area displays user-input fields which may be used to define associations between categories defined in the categorization area and stored information. The computer-executed process, when executed, uses the stored information that is linked to the selected categories to perform subsequent processing of the received message.

Various modifications to the foregoing aspects are possible. For example, the computer program product may further include a linking area that displays user-input fields which may be used to define associations between categories defined in the categorization area and stored information. In addition, the computer-executed process, when executed, uses the stored information that is linked to the selected categories to perform subsequent processing of the data.

In some modifications, the linking area may further display a number of user-selectable links. Each such link corresponds to a viewset that displays user-input fields which may be used to define associations between categories defined in the categorization area and stored information. One of such user-selectable links may correspond to a viewset that displays user-input fields which may be used to define associations between categories defined in the categorization area and any of documents, experts, or response templates. One of the user-selectable links may also correspond to a viewset that displays either a query input area for entering criteria that defines the content that corresponds to each category, or a preview area for viewing selected stored information. The GUI may also display in the categorization area user-selectable buttons that, when selected, enable information in the user-input fields to be edited using cut and paste functionality.

The linking area may further display an application area which may be used to define associations between categorization schemes that have been defined in the categorization area and pre-defined business processes that categorize the data. In that case, the linking area may be used to associate a number of business processes with a categorization scheme. Furthermore, at least two of the number of associated business processes can be executed using stored information determined to be linked to categories selected during a single categorization of the data. The categorization area may further display selectable buttons which may be used to change the level at which a category is defined.

The categorization area may further display selectable buttons associated with each parent category, wherein each parent category may be selectively displayed in an expanded form in which all child categories are graphically displayed, and selectively displayed in a collapsed form such that no child categories are graphically displayed.

In other modifications, the stored information may be stored in a number of memory locations in an enterprise computing system. The data may comprise content of a received message or comprise business objects. Such business objects may include stored documents or stored response templates.

In the foregoing examples, categorization schemes may be defined and maintained by an enterprise to obtain operational efficiencies provided by categorization schemes generally, and coherent categorization schemes in particular. The described graphical user interface provides a convenient, integrated tool for designing and maintaining hierarchical categorization schemes, and for defining links from categories to stored business objects. Use of this tool promotes effective utilization of categorization schemes by providing an easy-to-use interface that an enterprise can self-maintain and adapt over time as business processes evolve.

The details of one or more examples are set forth in the accompanying drawings and the description below. Other features, objects, and advantages will be apparent from the description and drawings, and from the claims.

DESCRIPTION OF DRAWINGS

FIGS. 4-10 are screenshots of a design-time user interface for defining categorization schemes according to FIGS. 3A-3B.

Like reference symbols in the various drawings indicate like elements.

DETAILED DESCRIPTION

This document describes a graphical user interface (GUI) that an enterprise can use to develop and maintain categorization schemes. First, it introduces a computing environment in which categorization schemes may be developed, maintained, and used. Then, for ease of understanding, it next describes categorization schemes themselves, including various run-time and structural aspects. Then, the document presents the GUI that an enterprise can use to develop and maintain the described categorization schemes.

Figure 1:
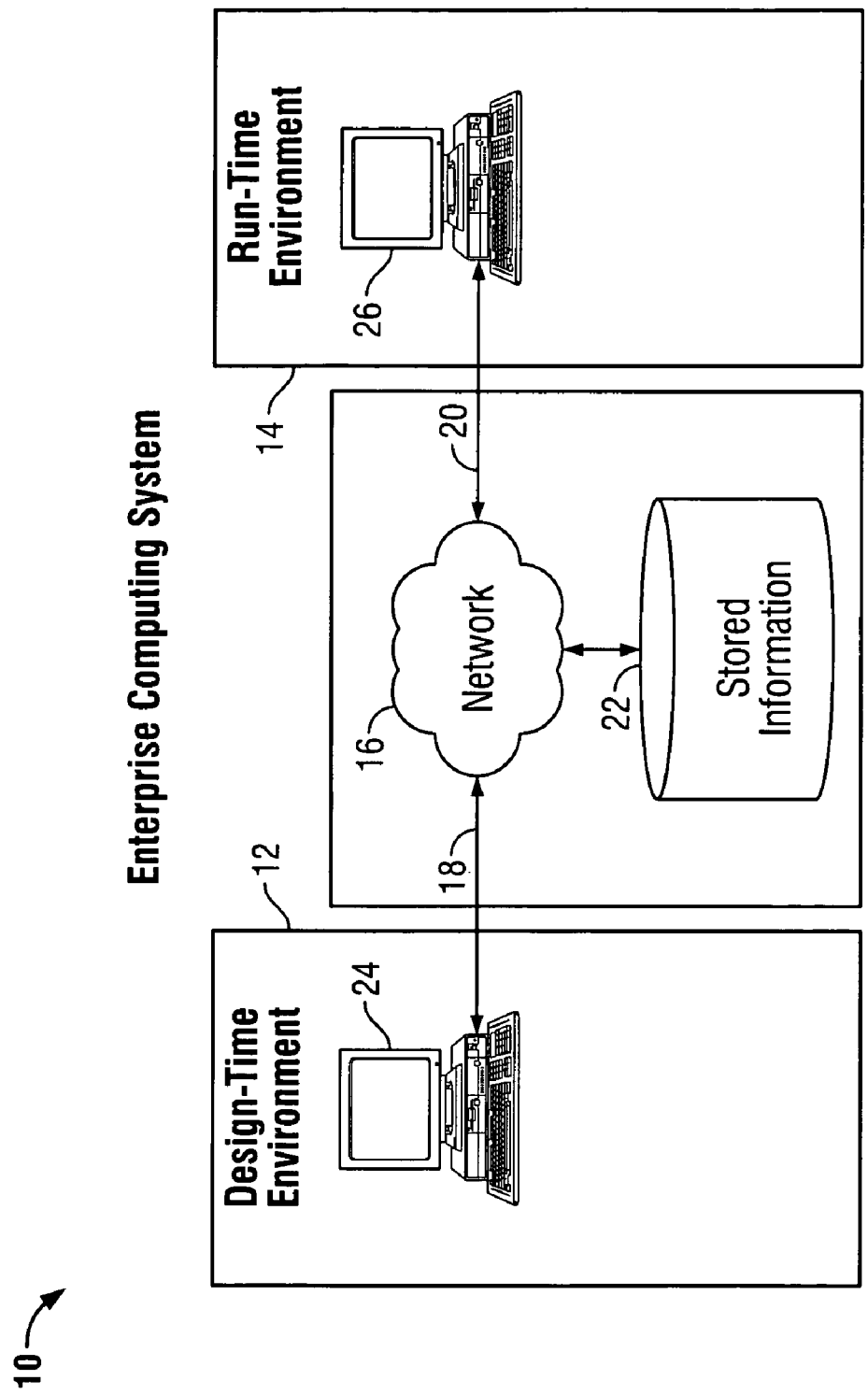
FIG. 1 is an enterprise computing system.

The introduction begins with an exemplary computing environment in which an enterprise may develop, maintain, and use categorization schemes for an exemplary business application, which could be an email response management system (ERMS). The enterprise computing system 10 that may be used to design and run (i.e., execute) the business application is shown in FIG. 1. The system 10 includes a design-time environment 12 in which a business application may be designed to meet the needs of a particular application. The system 10 also includes a run-time environment 14 in which the business application operates after its design has been completed. Stored information 22 relating to the business application is accessible by both the design-time and run-time environments 12, 14.

To design and execute a business application, information is moved, processed, and stored in the system 10. The design-time environment 12 is connected to a network 16 by connection 18, and the run-time environment 14 is connected to the network 16 by connection 20. The network 16, which may be, for example, an intranet, provides for communications within and between the design-time environment 12 and stored information contained in the repository 22. The network 16 also provides for communication over connection 20 between the run-time environment 14 and the stored information repository 22. The stored information container repository 22 may include knowledge bases, databases, application programs, and other information accessible by elements of the design environment 12 and the run-time environment 14. A user in the design-time environment 12 may use a computer terminal 24 to enter, modify, and remove information that may include information stored on the stored information repository 22. Similarly, a user in the run-time environment 14 uses a computer terminal 26 to perform run-time applications that can use access, modify, and delete information stored in the stored information repository 22.

In the design-time environment 12, software developers, for example, use various tools, including editors, debuggers and compilers, in order to develop software modules, user interfaces, executable programs, and the like, for use in the run-time environment 14. In developing such run-time environment applications, a user in the design-time environment 12 loads stored information from the stored information repository 22 through the network 16 and into the terminal 24 in order to manipulate that information. For example, the design-time environment 12 user may load application programs from the stored information repository 22 and use those application programs to create, for example, categorization schemes. These created categorization schemes can incorporate business objects and other data that is also loaded from the stored information repository 22 into terminal 24 in the design-time environment. The user can then store the modified categorization scheme, of this example, back into the stored information repository 22 where it may be accessed from the terminal 26 in the run-time environment 14. Accordingly, the user in the design-time environment 12 can store data and programs in the stored information repository 22 that the user in the run-time environment can use to perform run-time applications. Moreover, the run-time environment user may also manipulate stored information in the stored information repository 22. As such, the run-time environment 14 may affect the data in the stored information repository 22 that is subsequently used within the design-time environment 12.

The enterprise computing system 10 may be connected to additional networks, for example, the Internet. Although not shown in FIG. 1, the Internet may be connected to the design-time environment 12, the run-time environment 14, or the network 16 using standard communication interface hardware and software techniques.

Figure 2A:
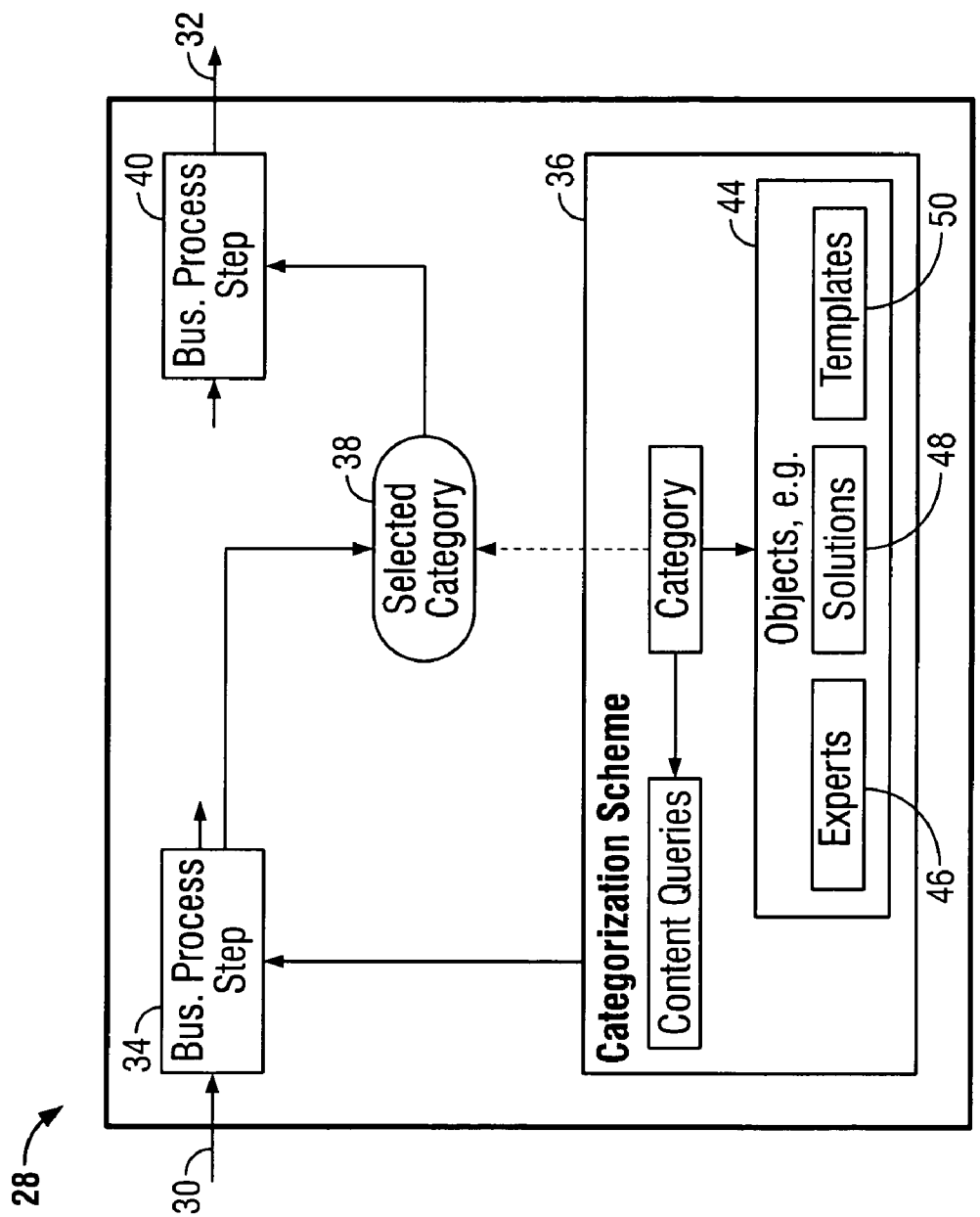
FIGS. 2A-2B are run-time flow diagrams of a business application using a coherent categorization scheme.
Figure 2B:
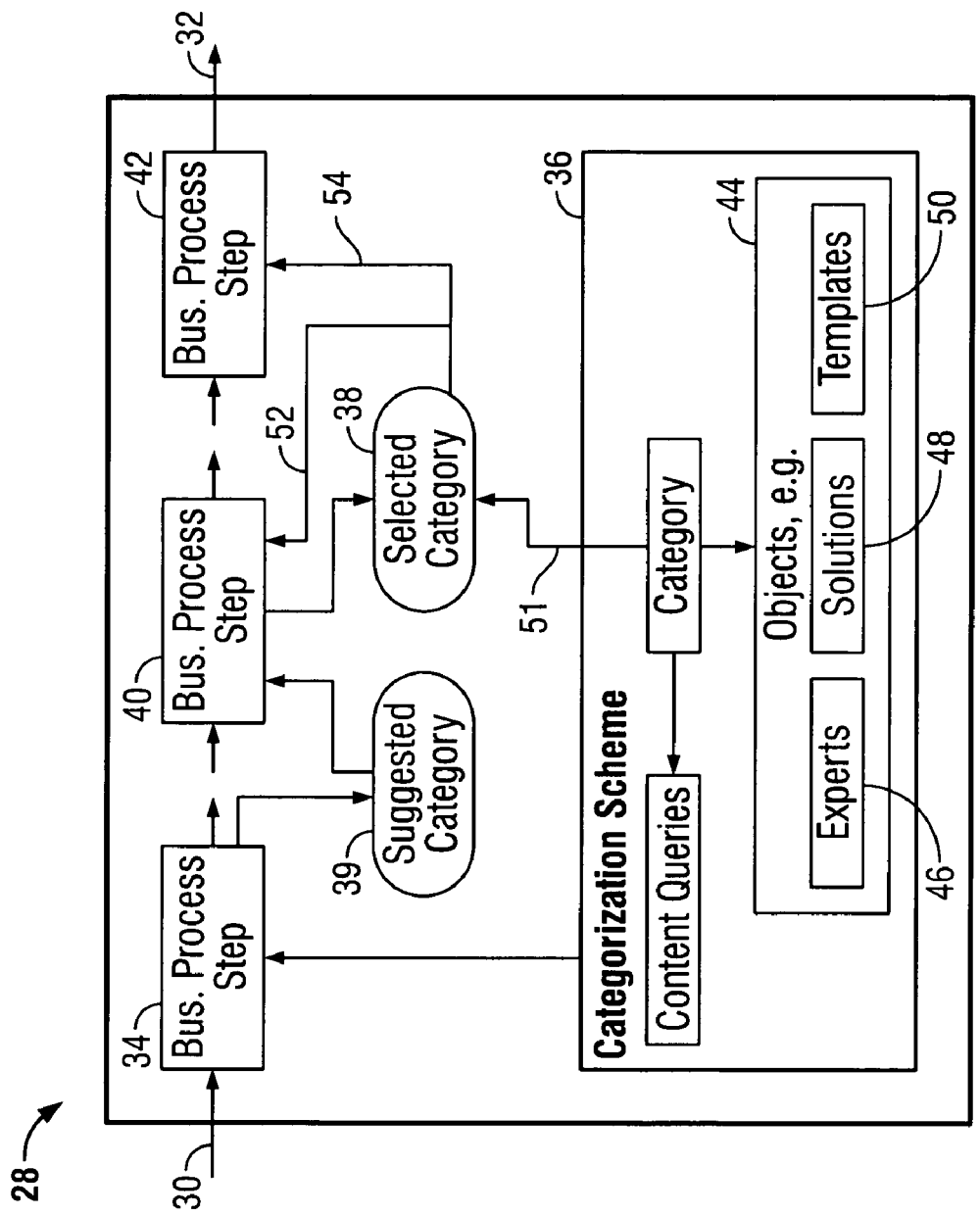

After a business application has been designed in the design-time environment 12, the business application can be executed in the run-time environment 14. Referring to FIGS. 2A-2B, a run-time flow diagram illustrates execution of a business application that uses coherent categorization to perform multiple business process steps. FIGS. 2A-2B illustrate use of coherent categorization schemes in two exemplary versions of the business application, namely a manual categorization, and an automated categorization.

In the manual version shown in FIG. 2A, the business application 28 responds to an input signal 30 by producing an output signal 32. A first business process module 34 executes instructions to perform one of the business application 28 business process steps. To perform that step, the module 34 categorizes the input signal 30. As will be shown with respect to FIG. 5B, a human user manually selects a category displayed on a user interface. The business process module 34 displays categories from a categorization scheme 36, and may limit the displayed categories to those that are relevant to performing the business process step 34. Moreover, because the business application is structured to use the categorization scheme 36, the selected category 38 may be used by a subsequent business process module 40 in the presence of the input signal 30.

Linked to the selected category 38 are linked business objects (BO's) 44. The linked BO's 44 may include information, such as, for example, experts 46, quick solutions 48, and response templates 50. Collectively, these linked BO's 44 may be used in multiple business processes, including business processes 34, 40. If the business application is an ERMS, for example, the input 30 may be an incoming e-mail message from a customer. In that case, the ERMS is used to respond to incoming e-mail messages by providing, for example, a reply e-mail message as the output signal 32.

The categorization scheme 36 is used in a coherent manner because it identifies a selected category 38 that provides relevant BO's 44 to more than one business process module, namely modules 34, 40. As such, the same categorization of an input signal is used to perform more than one business process step. In other words, each business process does not perform its own categorization, as was the case in prior art systems.

A categorization is performed in response to a particular input signal 30, and business processes are performed in reaction to (or in the presence on a particular input signal. As such, the particular selected category 38 is relevant to a business process only with respect to the content of a particular input signal 30. The selected category may be different for each new incoming input signal. Accordingly, the particular category that is selected within the categorization scheme 36 will depend upon the content of a particular input signal 30.

In the automated version of this example shown in FIG. 2B, a categorization scheme is used to automatically suggest a category, but a user can override that suggestion by manually selecting a different category. For example, the business process module 34 uses the categorization scheme 36 to automatically propose suggested category 39 to subsequently-performed business process module 40. In this example, the business process module 34 may include a content analysis engine for analyzing the content of the input signal 30. In the process of performing the business process module 34, the human user can choose to use the suggested category 39 to perform the business process module 40, or the user can manually select a different category. Whichever category the user selects may be referred to as the selected category 38. This selected category 38 is proposed to the subsequent business process step 42. As such, business process module 42 may use the selected category 38, or the user can override that choice and select a different category.

To promote the efficient performance of the business process modules 40, 42, linked business objects 44 may be filtered to provide only those business objects that are relevant to the business processes 40, 42. A link 51 represents the link from the selected category 38 to the entire set of linked BO's 44. A link 52 provides a subset of the linked BO's 44 to the business process 40. A link 54 provides another subset of the linked BO's 44 to the second business process 42. The business processes 40, 42 can each use the independent subsets of linked BO's 44 provided by respective links 52, 54 to perform their respective business processes within the business application 28.

The links 52, 54 may provide the same subset of linked BO's 44 to both business processes 40, 42. On the other hand, the links 52, 54 may provide subsets of linked BO's 44 that are different. In the latter case, each of the links 52, 54 may be configured to provide BO's that are of a certain type. For example, if the business process 40 is performed to provide a standard e-mail response template, then the link 52 may be configured to provide only BO's that are of the response template 50 type. Similarly, if the business process 42 is performed to select documents for attachment to a reply e-mail, then the link 54 may be configured to provide only BO's that are of the quick solutions 48 type, or of the experts 46 type.

Just as business objects are characterized by their type, each link between a category and a business object is characterized by a type. For example, a link from a category to a document of quick solution 48 type may be characterized as being of "is_solution" type. Similarly, links from categories to experts 46 and to response templates 50 may be characterized as being of "is_expert" and "is —response_ template" types, respectively.

The use of filtering may be illustrated, at least in part, in the context of an exemplary process of responding to an incoming email request that relates to printers. Initially, business process module 34 performs a content analysis of the input signal 30, and it identifies the key word "printer" in the email. The categorization scheme has a category that corresponds to "printer," so that category becomes the suggested category 39. When the business process module 40 is performed, the suggested category 39 may be displayed to the user as a proposed category. If the user determines that the email relates specifically to "laser printers," the user can override the suggested category by manually selecting a "laser printers" category that is a child of the "printers" category. Accordingly, the "laser printers" category becomes the selected category 38. Having selected a category, business objects linked to the "laser printers" category may be provided to the business process module 40 by the link 52. If, for example, the link 52 is configured to filter out business objects that are not of the response template 50 type, then only response templates 50 that are linked to the "laser printers" category are used.

As will be shown in detail below, one exemplary run-time implementation of the coherent categorization scheme automatically displays only those business objects that are in the set of linked BO's 44 associated with the selected category 38. In the exemplary business application 28, BO's 44 that are not relevant to the business process being performed are, at least initially, filtered out. As such, they are not automatically provided to the business process. Instead, only those BO's most likely to be used are initially displayed to the user. Nevertheless, the user can choose to display business objects that are not linked to the selected category, if that is desired.

By initially displaying only the linked BO's 44, and by filtering out linked BO's that are not of the most relevant type to a business process, a categorization scheme reduces the time and effort the agent must spend performing a business process step. As such, the agent can realize productivity and efficiency improvements. If the categorization is also coherent, a single categorization can serve more than one business process step. By reducing the number of categorizations required to perform a number of business process steps, a coherently categorized system further reduces or eliminates unnecessary time and effort the agent must spend to perform multiple business process steps. As such, coherently categorized systems can yield further efficiency and productivity gains over systems that are not coherently categorized.

Figure 3A:
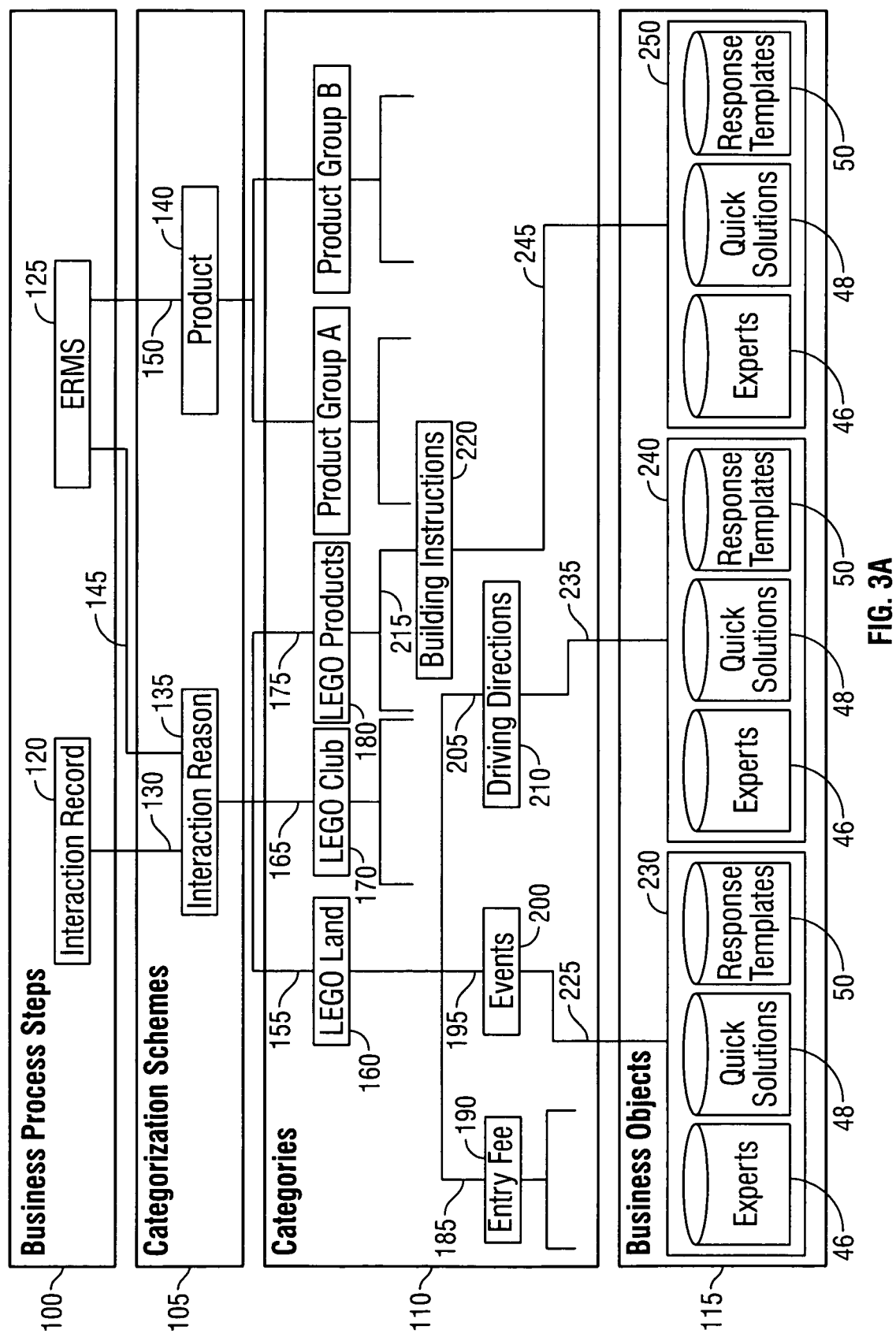
FIG. 3A is a categorization scheme.
Figure 3B:
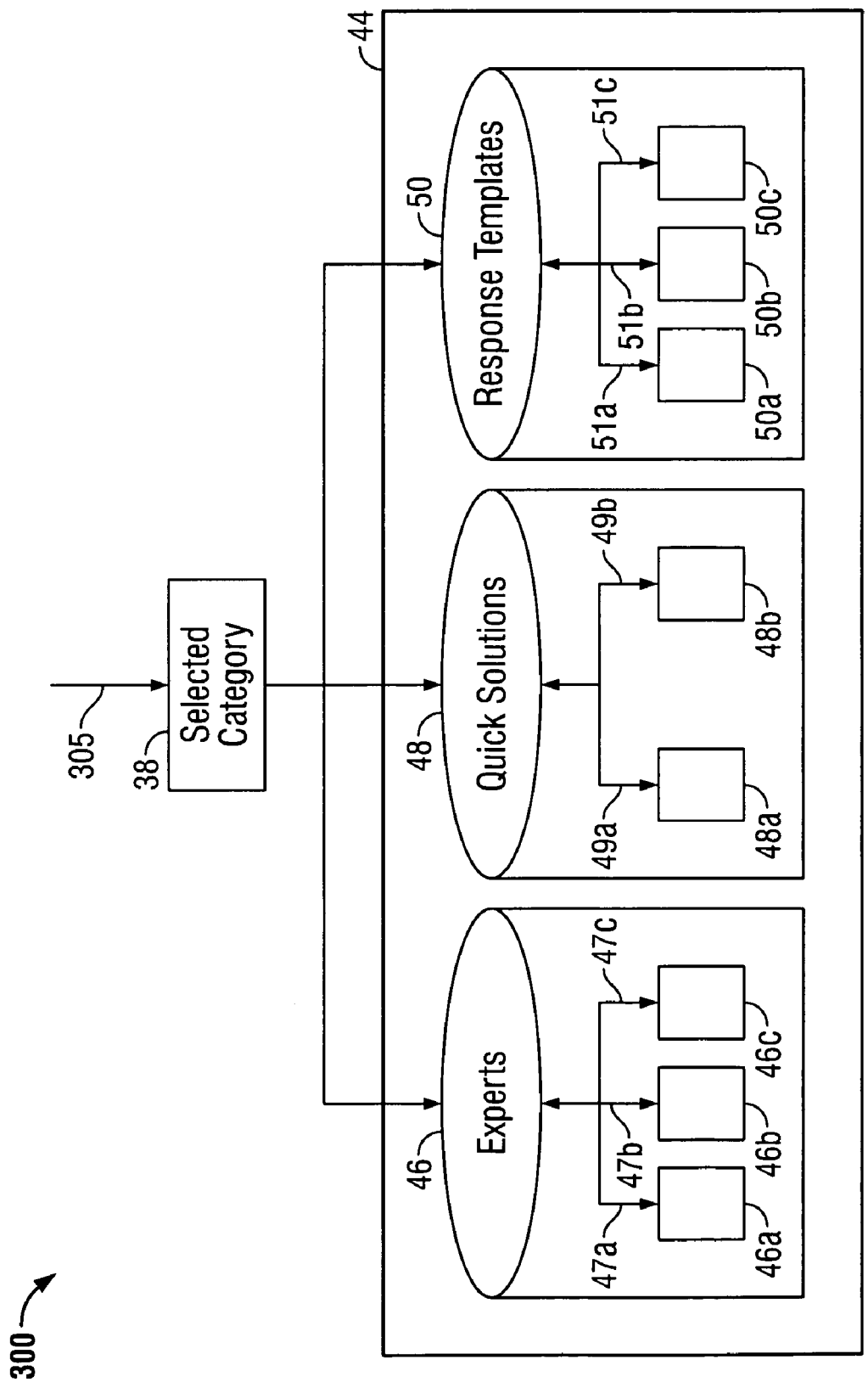
FIG. 3B is a portion of the categorization scheme of FIG. 3A with additional detail.

The selection of categories to perform the foregoing exemplary business process steps depends on the structural details of the categorization scheme itself. The structures of two exemplary categorization schemes that may be used in the business application 28 (e.g., ERMS) of FIGS. 2A-2B are illustrated in FIGS. 3A-3B. In general, FIGS. 3A-3B illustrate how categorization schemes can be used to relate business process steps to relevant business objects, as well as how categorization schemes define relationships between categories.

Referring to FIG. 3A, a set of business process steps 100 may be performed, either automatically or in response to user input, during the run-time execution of a business application. The steps in the set of business process steps 100 are linked to a set of categorization schemes 105. Each categorization scheme in the set of categorization schemes 105 is linked, directly or indirectly, to multiple categories 110. The categories may be distributed across any number of levels. For example, the categories may be arranged in a hierarchical structure having several levels, or they may be arranged in a flat structure in a single level. In hierarchically structured categories, each category below a top level is linked to one parent in the next higher level, and may be linked to any number of child categories in the next lower level. Parent/child categories may also be referred to as categories/sub-categories. Any of the categories 110 may be linked to one or more business objects 115.

Accordingly, the categorization schemes 105 relate business objects 115 to the business process steps 100. By defining these associations, categorization schemes reflect relationships between business processes and resources (i.e., business objects), especially stored information, in the enterprise computing system 10. Moreover, if a categorization scheme 105 identifies a selected category from among the categories 110 that subsequently provides relevant BO's 115 to more than one business process step 100, then that categorization scheme 105 may be referred to as a "coherent" categorization scheme. In business application that includes coherent categorization, a single categorization may be used to provide business objects to multiple ERMS business process steps. As such, the categorization schemes 105 may reflect relationships across multiple business processes.

For example, FIG. 3A shows an interaction record business process step 120 and an ERMS business process step 125. The interaction record business process step 120 is linked by a link 130 to an interaction reason categorization scheme 135. The ERMS business process step 125 is linked by a link 145 to the interaction reason categorization scheme 135, and it is linked by a link 150 to the product categorization scheme 140. Each of the categorization schemes 135 and 140 are linked to a number of categories. The interaction reason categorization scheme 135 is shown as having a hierarchical structure, while the product categorization scheme 140 is shown as having a flat structure. Under the interaction reason categorization scheme 135, there is a link 155 to a LEGOLAND® category 160, a link 165 to a Lego® club category 170, and a link 175 to a Lego® products category 180. The categories 160,180 have further sub-categories. The LEGOLAND® category 160 has a link 185 to an entry fee category 190, a link 195 to an events category 200, and a link 205 to a driving directions category 210. Similarly, the Lego® products category 180 has a link 215 to a building instructions category 220. Other links and categories may be added or removed from the interaction reason categorization scheme 135 to provide different responses for the business process steps 120, 125.

By way of example, each of the categories 200, 210 and 220 is linked to relevant business objects within the business objects 115. For example, the events category 200 has a link 225 to a set of business objects 230. As will be described with reference to FIG. 4, the link 225 represents a set of links, whereby each business object in the set of business objects 230 has a uniquely defined link between each business object in the events category 200. Similarly, the driving directions category 210 has a link 235 to a set of business objects 240, and the building instructions category 220 has a link 245 to a set of business objects 250. The sets of business objects 230, 240, 250 each include experts 46, quick solutions 48, and response templates 50.

As has been previously suggested, the sets 230, 240, 250 of business objects are selected from available business objects as being relevant to the categories to which they are linked. As such, the number of business objects of a particular type that are included within the particular set of business objects linked to a category can vary based on the number of business objects that are available. For example, the number of experts that are included in the set of linked business objects 230, 240, 250 depends upon the availability of subject matter experts who have knowledge relevant to the appropriate category. Similarly, the numbers of quick solutions 48 and response templates 50 that are included in a set of linked business objects 230, 240, 250, depend upon the stored contents of, for example, a knowledge base within the stored information repository 22 (FIG. 1).

Accordingly, if the interaction record business step 120 is being performed in the presence of an input signal 30 (not shown), then content of the input signal 30 will determine how the categorization scheme 135 is navigated. If the content of the input signal 30 relates to driving directions to LEGOLAND®, then the categorization scheme would be navigated through the link 155 to the LEGOLAND® category 160, and through the link 205 to the driving directions category 210. If the ERMS business process step 125 is subsequently performed while responding to the same input signal 30, then the business process step 125 will automatically receive business objects that relate to the chosen driving directions category 210 from the set of business objects 240.

Thus, in the foregoing example, the performance of the interaction record business process step 120 categorizes the input signal 30 to select and use the driving directions category 210. The selected category may subsequently be used by a later business process step, in this example, the ERMS process step 125. Accordingly, the exemplary categorization scheme just described exhibits coherency because a selected category identified in one step of a business process can be used to perform a subsequent business process step.

Although the FIG. 3A represents only business object being linked to categories that exist at a lowest level (children) categories in the hierarchy, business objects may be also be linked to any category that is a parent category. As such, a categorization scheme may be defined such that any category that is selected may be linked to a set of business objects 44.

Additional structural detail of a categorization scheme in accordance with the categorization schemes of FIG. 3A is shown in FIG. 3B. In one example, FIG. 3B illustrates the selected category 38 in a magnified portion of a hierarchical categorization scheme 300. The selected category 38 is linked by a link 305 to a parent category (not shown) above it. The selected category 38 is also linked to the linked business objects 44. The selected category may exist at any level in the hierarchical categorization scheme 300. Each of the linked business objects 44 are selected from among all available business objects that are stored, for example, in a database (not shown) in the enterprise computing system 10. The linked business objects 44 may include experts 46, quick solutions 48, and/or response templates 50.

Each of the linked business objects 44 is linked to the selected category 38 by a unique link. Individual experts 46a, 46b, and 46c are linked to the selected category 38 by links 47a, 47b, and 47c, respectively, of the "is_expert" type. Individual quick solutions 48a, 48b are linked to the selected category 38 by links 49a, 49b, respectively, of the "is_solution" type. Individual response templates 50a, 50b, and 50c are linked to the selected category 38 by links 51a, 51b, and 51c, respectively, of the "is_response_template" type. Accordingly, one way to modify the categorization scheme is to modify the links 47a, 47b or 47c; 49a or 49b; or 51a, 51b or 51c.

Use of the categorization schemes of FIG. 3A in, for example, the manually performed category selection in the business application 28 (FIG. 2B) involves the identification of one or more appropriate categories from within a categorization scheme 36. An exemplary process for manually identifying a selected category 38 is conceptually illustrated in FIG. 3C. An exemplary user interface suitable for manually selecting a category is presented in FIG. 3D.

Figures 3C, 3D:
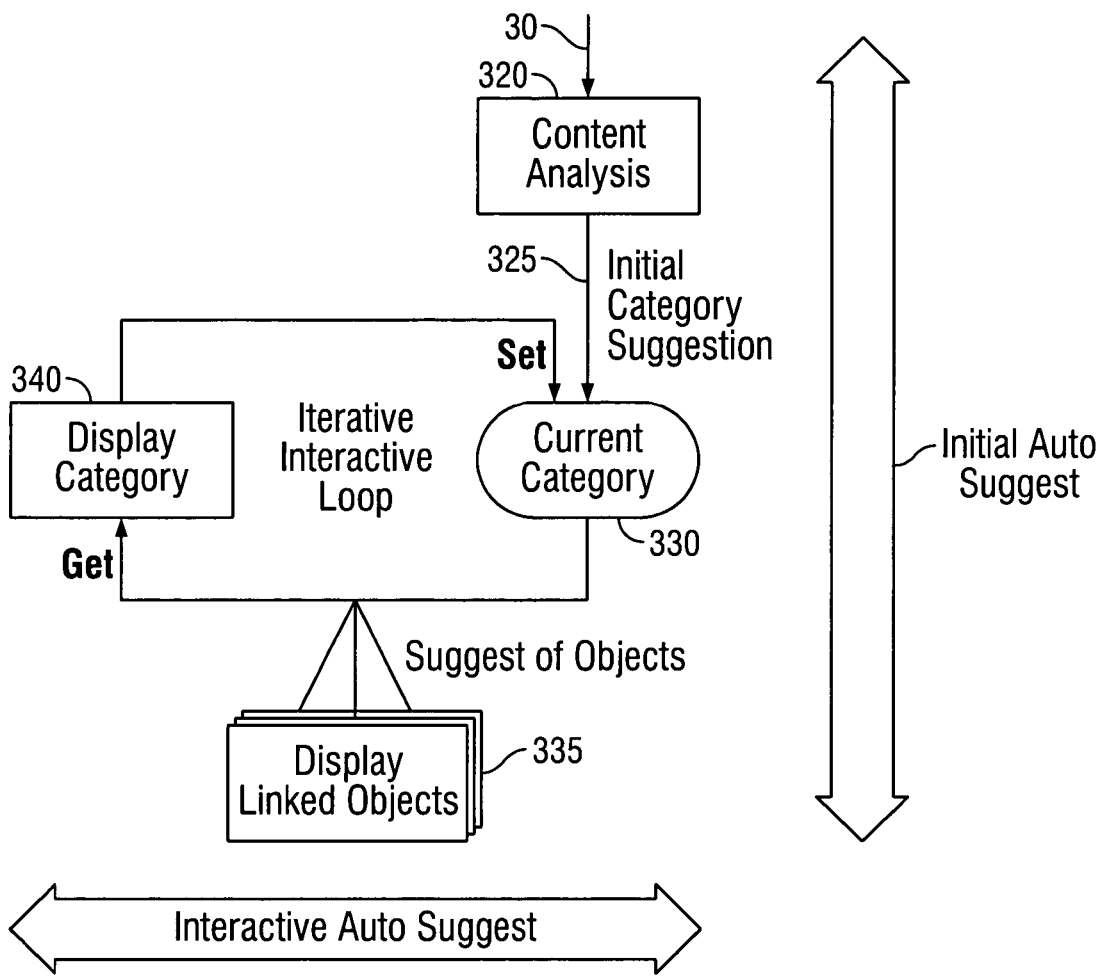
FIG. 3C is a conceptual diagram of the process steps performed when manually selecting a category in a categorization scheme in accordance with FIG. 2B.
FIG. 3D is a user interface for manually selecting categories using the process of FIG. 3C.

In the example shown in FIG. 3C (and with reference to FIG. 2B), the contents of the incoming message 30 is analyzed at 320 by, for example, a content analysis engine that searches the message for key words that match queries defined for the categories in the categorization scheme 36. In various embodiments, the key word search can be performed either by a human user, or by a programmed computer. Attributes of a category include properties assigned at design-time, and a category's attributes determine whether a category matches the analyzed content of an incoming message. Content analysis may be performed on the textual content of an unstructured incoming email, for example, by performing query-based categorization, example-based classification (using, e.g., either a nearest neighbor, or a support vector machine algorithm on stored previous examples), a combination of both, or other effective method of content analysis.

The content analysis engine 320 uses a categorization scheme 36 to automatically suggest an initial category 325. This initial category suggestion becomes the current category 330. If a category is found not to have attributes that match the analyzed content, then no category may be initially suggested.

With the current category 330 initially determined, an interactive auto-suggest cycle begins. Business objects 335 that are linked to the current category 330 may be displayed and suggested to the user, thereby allowing the user to quickly access those business objects that are likely to be relevant to the business process step being performed. The user interface, in this example, displays the selected category to the user at 340.

With reference to the user's option to choose a different category 38 than the suggested category 39 in FIG. 2B, the user can iterate as needed by selecting a different current category 330. In turn, the user interface will again display the objects 335 that are linked to the updated current category. In this manner, the user can choose to use the business objects that are linked either to the initially suggested category 325, or to a manually selected-category.

The foregoing manual selection process can be implemented in a graphical user interface that may be accessed while performing a business process step that involves categorization. An exemplary user interface 350 is illustrated in FIG. 3D. The user interface 350 includes a number of fields that contain drop down list boxes (DDLBs). The user can select a category, for example, from a DDLB 360 labeled "Classification 1." When selected, the DDLB 360 will display categories that are in a top-level a hierarchical categorization scheme. With reference to FIG. 3A, a top-level category would correspond, for example, to categories at the level of the categories 160, 170, 180. The user can then select a category, for example, from a DDLB labeled "Classification 2." When selected, the DDLB 360 will display categories that are in a level just below those in the DDLB 355. With reference to FIG. 3A, these categories would correspond, for example, to categories at the level of the categories 190, 200, 210. The user interface 350 would provide additional levels of categories as needed to permit the user to select any category within the categorization scheme.

The user interface 350 can also provide the functionality that the selection of a category in the DDLB 355 will narrow the displayed alternative categories when the DDLB 360 is selected. This permits the user to quickly work down the categorization scheme from a top level to lower levels without the need to sort through unrelated categories. After the user has selected a category using the user interface 350, the business process that is being performed can use the business objects that are linked to the selected category.

In some circumstances, a run-time user may select any appropriate linked business objects to perform steps in a business process. In other examples, the run-time user may elect not to use any of the linked business objects, opting instead, for example, to use non-linked business objects, or to use no business objects at all. After all steps that require categorization of the incoming message have been performed, then the run-time use of the coherent categorization ends.

Graphical User Interface (GUI)

With the foregoing introductions to the computing environment and to categorization schemes, this document next describes the GUI that may be used to define categorization schemes. The above-described categorization schemes may be defined in the design-time environment 12 using an exemplary graphical user interface (GUI) 400 shown in FIG. 4. The user interface 400 includes a categorization area 410 and a linking area 420. In the design-time environment 12, a developer can enter, modify, and display information about categories in a categorization scheme. Specifically, the user can create a categorization scheme in the category area 410, and can enter information associated with each category in the linking area 420. The user interface 400 further includes one or more tabs such as, for example, the ERMS business process step tab 125. In other implementations, tabs for other business process steps (not shown) may be included in the user interface 400. When the user selects a desired business process step tab, then the user interface 400 will display the categorization schemes associated with that business process step in the categorization area 410. In this example, the ERMS business process step tab 125 is selected. As such, the interaction reason categorization scheme 135 (shown in FIG. 3A) and the Lego® Org chart categorization scheme 440 (not shown in FIG. 3A) are displayed in the categorization area 410.

Using the user interface 400, a user can arrange categories within the categorization area 410 to have hierarchical relationships within the categorization scheme. The categorization area 410 includes a name column 425 that displays the names of categorization schemes and categories in rows. The user can enter, modify, and display categories in the name column 425. Adjacent to the name column 425 is a description column 430 that displays a description of the corresponding category in the name column 425.

Along a top area 435 of the categorization area 410 is a plurality of selectable buttons. Each of these selectable buttons can be used to create or modify categories in the categorization area 410. The buttons in the top area 435 include a save button 436, that saves the displayed categorization scheme to a data file or to files in a storage location, such as the stored information repository 22 (FIG. 1). The top area 435 also includes a create sub-node button 437 that inserts a new row below a category that is highlighted (i.e. selected) by the user in the categorization area 410. A new category may be entered into the categorization scheme by inserting it into the inserted new row, and the new category will be a child category of the highlighted category in the row above it.

For example, and with reference to FIG. 3A, the LEGOLAND® category 160 is linked to three child categories, namely driving directions 210, entry fee 190, and events 200. Each of these categories 190, 200, 210 could have been entered as a (child) category into the categorization area 410 by pressing the create sub-node button 437 and entering the category name into a row below the row containing the (parent) LEGOLAND® category 160. This is one example of how the categorization area 410 may be used to enter categories and sub-categories to create a hierarchical categorization scheme.

The top area 435 also includes other editing buttons 438 for performing cut, copy and paste functions. The editing buttons 438 may be used, for example, to edit and/or move the location of categories within the categorization area 410. Note that in some implementations, such a move or a copy would cause the text in the description column 430 to move or to copy the corresponding category to the adjacent name column 425. As such, the text in the description column 430, as will be described with respect to the linking area 420, is a property of the corresponding category in the name of column 425. In addition, the top area 435 may also include a delete button 439 that the user may select to modify the categorization scheme. By selecting the delete button 439, the user can delete a highlighted row from the categorization scheme. Other features may optionally be incorporated, for example, in the top area 435. Such optional features may include a button for printing 441, and an "add to favorites" button 442, each of which is familiar to web browser users.

In the name column 425, indicators that precede the name of each categorization scheme and category indicate the hierarchical relationships among categories. For example, bullets in the name column 425 precede the categories 190, 200 and 210. These bullets indicate that these categories are terminal categories within the hierarchy of the interaction reason categorization scheme 135. Within the name column 425, the Lego® club category 170, the LEGOLAND® category 160, and the Lego® products category 180 are preceded by either a right-pointing or downward-pointing triangle marker within the name column 425. A right-pointing marker, such as the markers that precede the Lego® club category 170 and the Lego® products category 180 in the name column 425, indicate that no child categories are displayed. A downward-pointing marker, such as the one that precedes the LEGOLAND® category 160 in the name column 425, indicates that any linked child categories are displayed in the rows immediately beneath that parent category. If a user clicks on the downward-pointing marker, then the marker will change state to a right-pointing marker, and no child categories will be displayed. Similarly, if a user clicks on the right-pointing marker, then the marker will change state to a downward-pointing marker, and existing child categories (if any) will be displayed. In this example, the LEGOLAND® category 160 has one level of child categories which are all terminal categories. Other implementations are also possible. For example, multiple levels of categories may be defined within a categorization scheme. Alternatively, a flat structure may be defined for a categorization scheme such that there are no child categories.

Similar to categories, categorization schemes are also preceded by indicators. In the name column 425, two categorization schemes, namely, the interaction reason categorization scheme 135, and the Lego® Org Chart categorization scheme 440, are displayed with preceding indicators. In this example, a downward-pointing arrow precedes the interaction reason categorization scheme 135. Accordingly, the categories below the interaction reason categorization scheme 135 are displayed. In contrast, the Lego® Org Chart categorization scheme 440 is preceded by a right-pointing marker in the name column 425. As such, no categories under that categorization scheme are displayed in the name column 425.

The number of categories displayed in the categorization area 410 is limited by the number of rows displayed. If the number of categories and categorization schemes to be displayed exceeds the number of displayable rows in the categorization area 410, then non-displayed rows can be viewed by scrolling the displayed rows up or down using the scroll buttons 445. In this way, the user can control which rows are displayed in the categorization area 410.

Accordingly, the categorization area 410 in the user interface 400 serves as a tool to enter, modify, and display categorization schemes in the design-time environment 12. As can be appreciated, the categorization area 410 is used to define various links that structure the hierarchical relationships within the categorization scheme. With reference to FIG. 3A, the categorization area 410 is used to define the links 155, 165, 175 between the categorization scheme 135 and the categories-160, 170, 180. Furthermore, the categorization area 410 is used to define the links 185, 195, 205 between the parent category 160 and the child categories 190, 200, 210. However, the categorization area 410 in this example does not (by itself) define links between business process steps and categorization schemes, or between categories and business objects. In this example, those links are defined in conjunction with the linking area 420.

In the linking area 420, a number of tabs are provided to display various fields related to a user-highlighted category in the categorization area 410. In this example, the driving direction category 210 is the highlighted category in the categorization area 410. The tabbed view sets in the linking area 420 include the details viewset tab 450, the query viewset tab 455, the example documents viewset tab 460, the standard responses viewset tab 465, and the knowledge entities viewset tab 470. Each of these viewset tabs 450-470 in the linking area 420 will now be described in turn.

The details viewset tab 450 is selected in FIG. 4. The details viewset tab 450 includes a general area 472 for entering information about a selected category. In this example, the user interface 400 is used to enter and modify information about the selected driving directions category 210. One field in the details viewset tab 450 is used to enter and modify the category name 475, which, in this case, is "driving directions." Another field is the category ID field 476. The category ID is a language-independent internal (not displayed) identifier to facilitate matching. In contrast to the category ID, the category's name is a language-dependent label that is displayed on the user interface in association with the corresponding category. A parent category field 477 displays the name of the parent category, which, in this case, is "LEGOLAND®" corresponding to the LEGOLAND® category 160.

A description field 479 permits the user to enter a textual description of the category. This provides a description of the category's semantic meaning in addition to the meaning expressed by the "name" (or label). The textual description in the description field 479 is displayed in the description column 430 in the categorization area 410, and specifically the highlighted row. Other auxiliary information, such as a creation date, identity of the author (i.e. "created by"), a last modified date, a last modified by, and a status field illustrate the exemplary configuration of the linking area 420. Each of these fields may optionally be populated to further define the characteristics of the selected driving directions category 210. For example, the parent category field 477 may be automatically populated based on the parent-child relationship already displayed in the categorization area 410 between the (parent) LEGOLAND® category 160 and the (child) driving directions category 210.

Figure 5A:
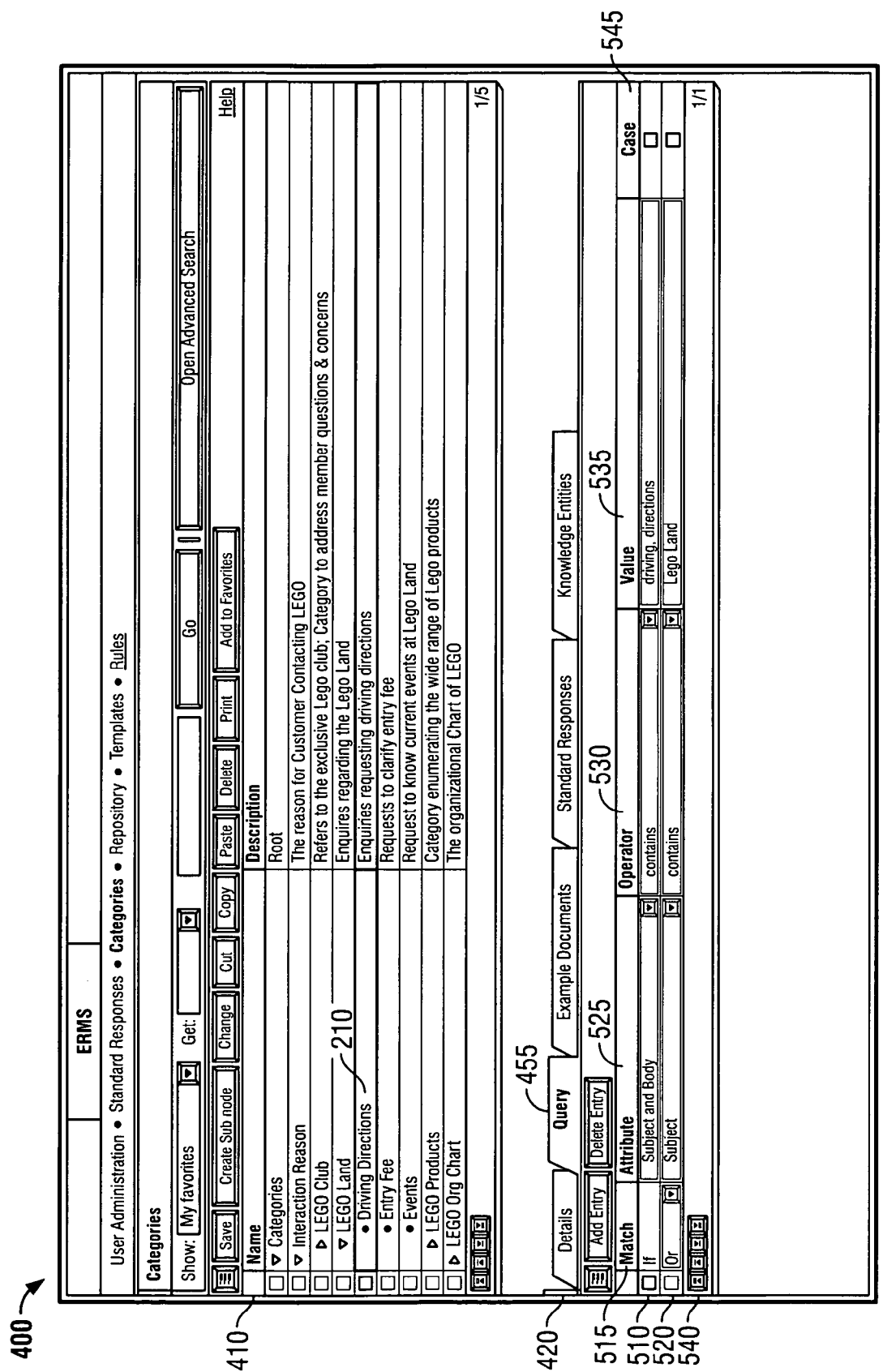
Figure 5B:
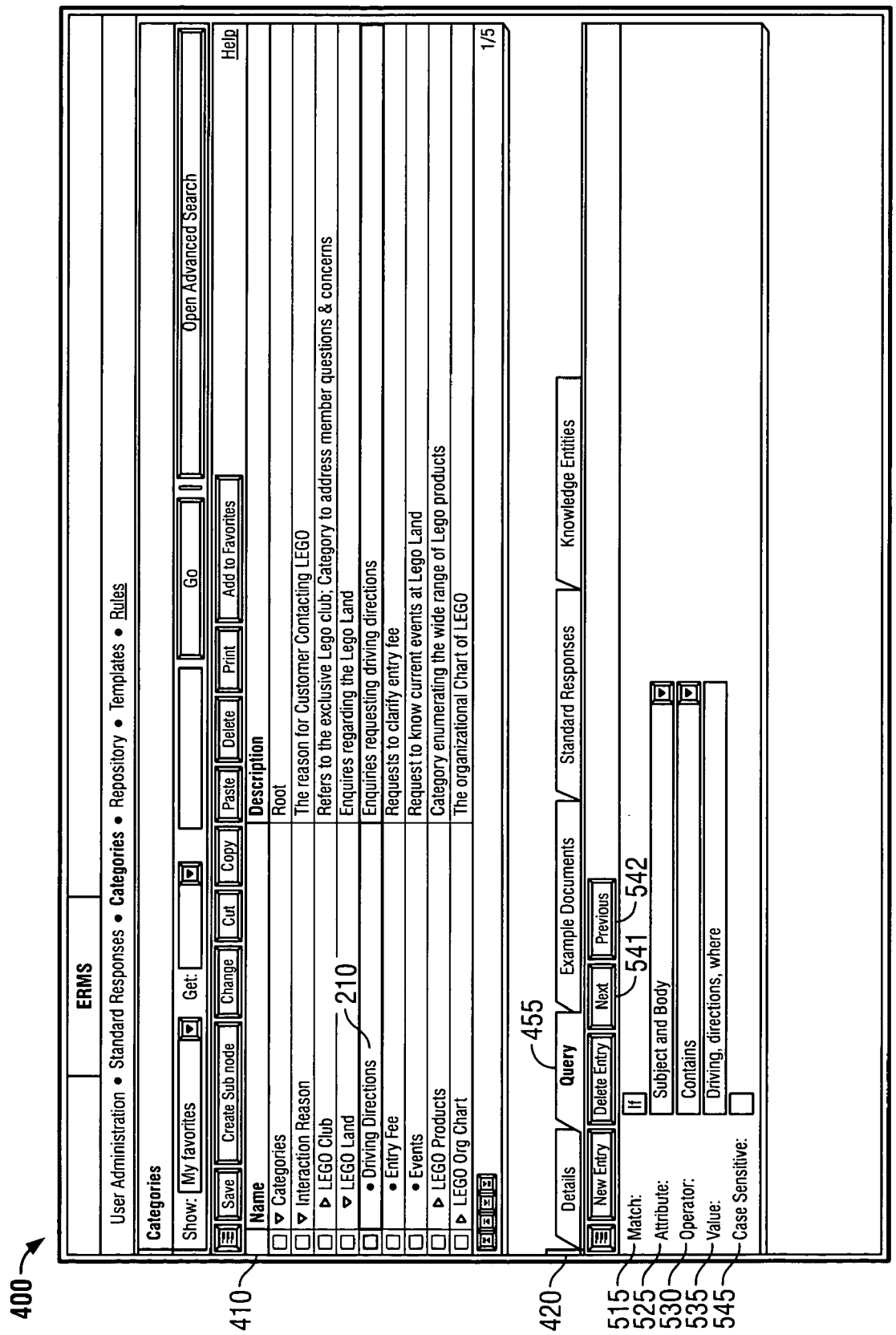

In FIGS. 5A-5B, the query viewset tab 455 is selected. In this example, the user interface 400 is used to define a query for the highlighted category. The defined query can be evaluated to determine if the content of an e-mail corresponds to that category.

In the query viewset tab 455, two rows of query criteria are shown. Elements for defining a query may be entered into columnar fields defined in a first row 510 and a second row 520. In the first row 510, a match column 515 includes a leading "if" statement. In the second row 520, the match column 515 includes a user-selectable drop-down list box (DDLB) into which the user can select various conditional conjunctions such as, for example, "and," "or," and "nor." The conjunction provides the logical operation that connects queries in the rows 510, 520. For example, if, in the run-time environment 14, the row query 510 evaluates as "true," and if the row query 520 evaluates as "false," and if the conjunction 515 in the row 520 is "or," then the complete query will evaluate as "true." However, if the conjunction 515 in the row 520 is "and," then the complete query will evaluate as "false." If the complete query for a category evaluates as "true", then the content of the e-mail "corresponds" to that category. On the other hand, if the complete query evaluates as "false", then the content does not correspond to that category.

The row queries for rows 510, 520 are defined by columnar fields in each row. An attributes column 525 provides a DDLB through which the user can identify attributes that are to be evaluated using the query defined in that row. For example, if the query of an e-mail relates to information contained in both the subject line and the body of the email, each row query can evaluate the content of the subject line, the body, or both. In this example, the row 510 will evaluate "subject and body", while the row 520 query evaluates only the "subject".

An operator column 530 provides a DDLB through which the user can define the relational operator to be used to evaluate the query in that row. For example, the operator column 530 may include operators such as equality, inequality, greater than, less than, sounds like, or includes. A value column 535 provides a field in each of rows 510, 520 into which the user can enter values for each row query. If the attribute 525 and the value 535 in a row query have the relationship of the selected operator 530, then that particular row will evaluate as "true." If the attribute 525 and the value 535 do not have the relationship of the selected operator 530 for a particular row, then that particular row will evaluate as "false." Each row is connected to the previous row or to the subsequent row through a logical match operator 515, such as "and," "or," and "nor." Although only two rows 510, 520 are shown in this example, other rows may be entered using the scroll keys 540. A case column 545 provides a check box which, when checked, makes the query in that row case sensitive.

An alternative example for displaying the linking area 420 when the query viewset tab 455 is selected is shown in FIG. 5B. In this example, the scroll buttons 540 (of FIG. 5A) have been replaced with next and previous buttons 541, 542. In this example, one row of a query can be entered using the match 515, attribute 525, operator 530, value 535, and case sensitive 545 fields.

Figure 6:
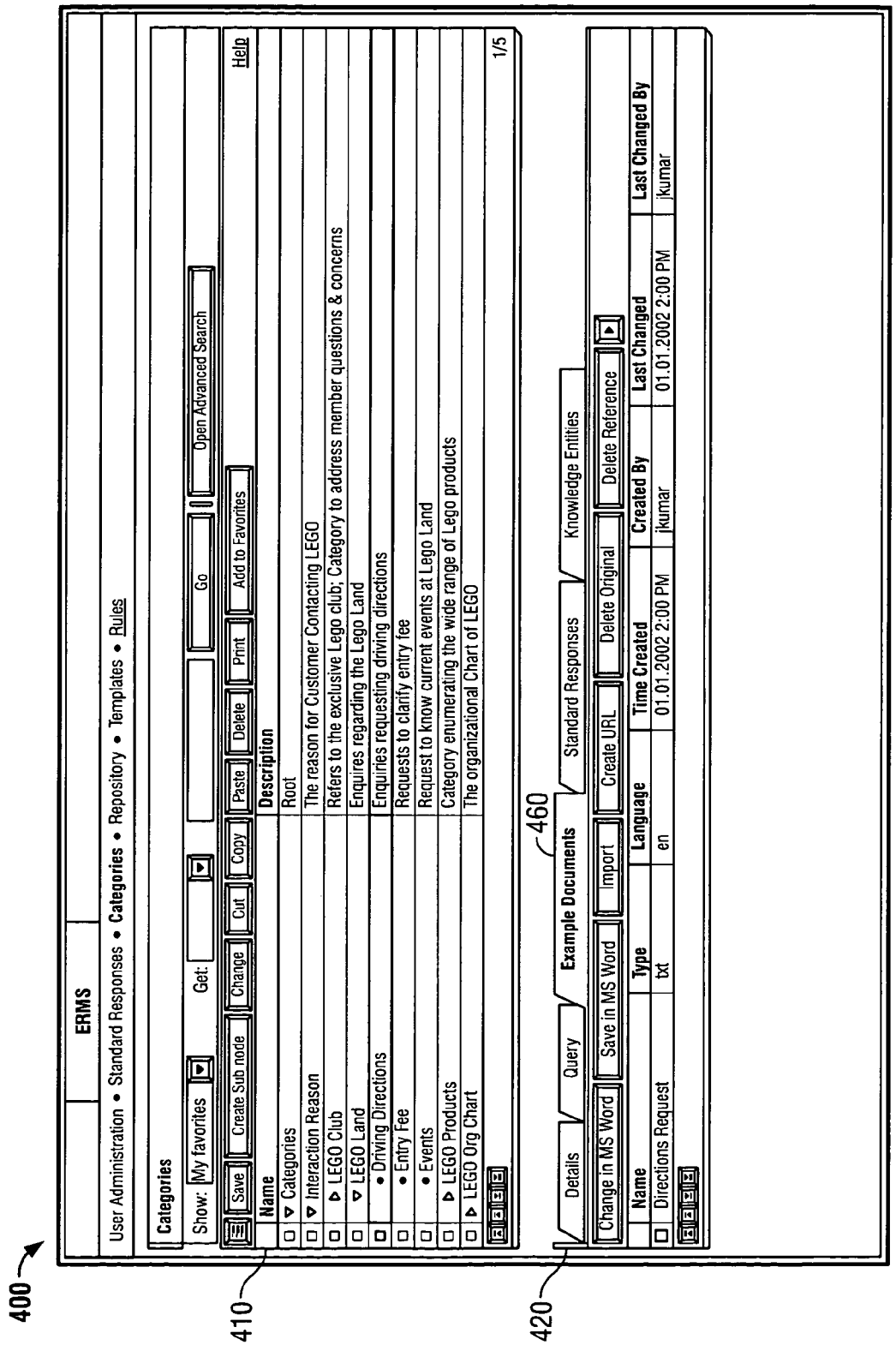

In FIG. 6, the example documents viewset tab 460 is selected. In this example, the user interface 400 is used to enter and modify example documents. In this context, example documents are prototypical documents for the given category. A document may be determined to be prototypical based upon historical usage statistics with regard to a particular category.

In FIG. 7, the standard responses viewset tab 465 is selected, and the linking area 420 includes a response template area 705 and a response preview area 710. In this example, the user interface 400 is used to enter and modify links between a selected category in the categorization area 410 and e-mail response templates 50 in the response template area 705. In this example, the second row 715 of the response template area 705 is highlighted, and the response preview window 710 displays the text associated with the response template 50 that contains driving directions to LEGOLAND® California.

Figure 9A:
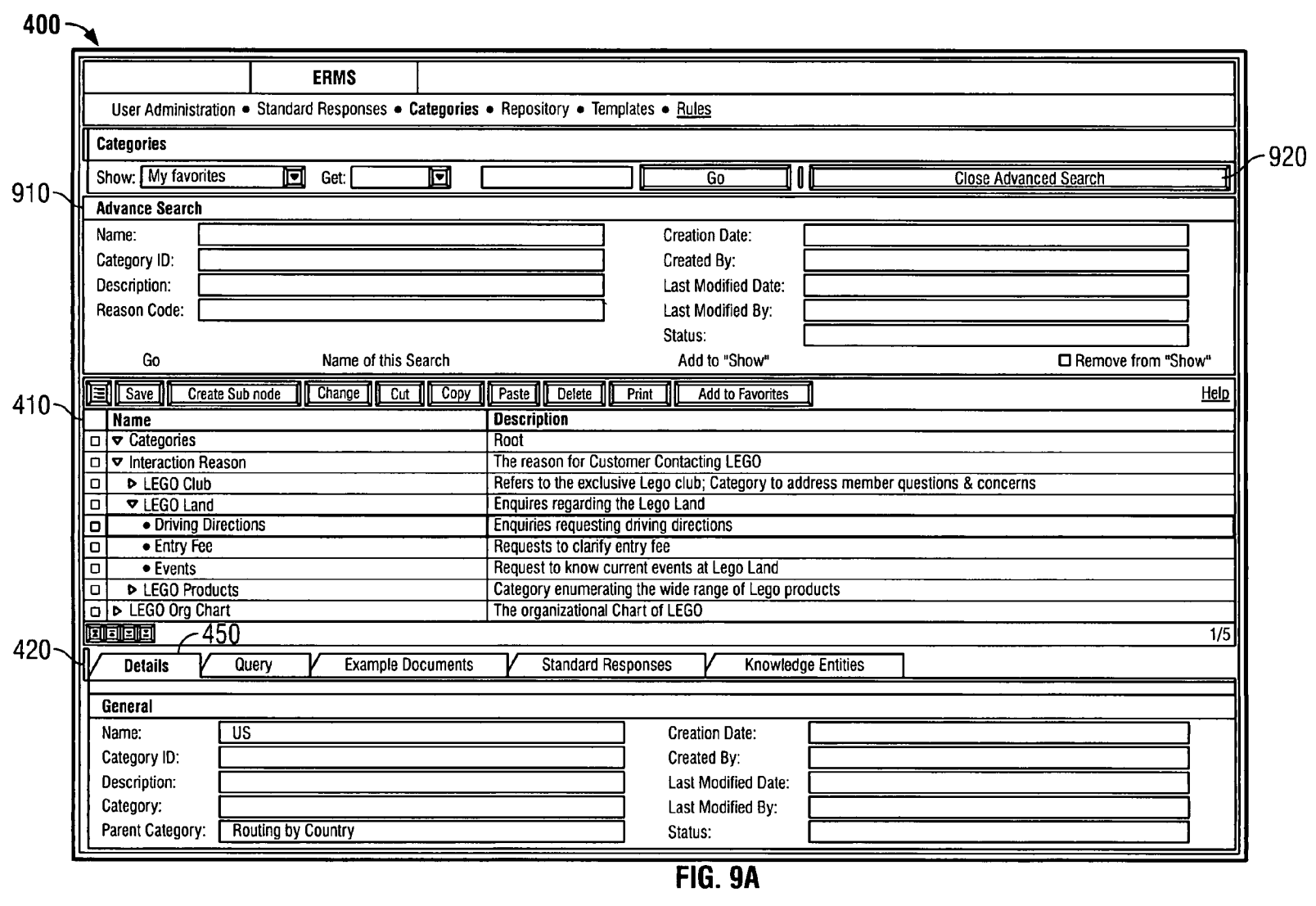
Figure 9B:
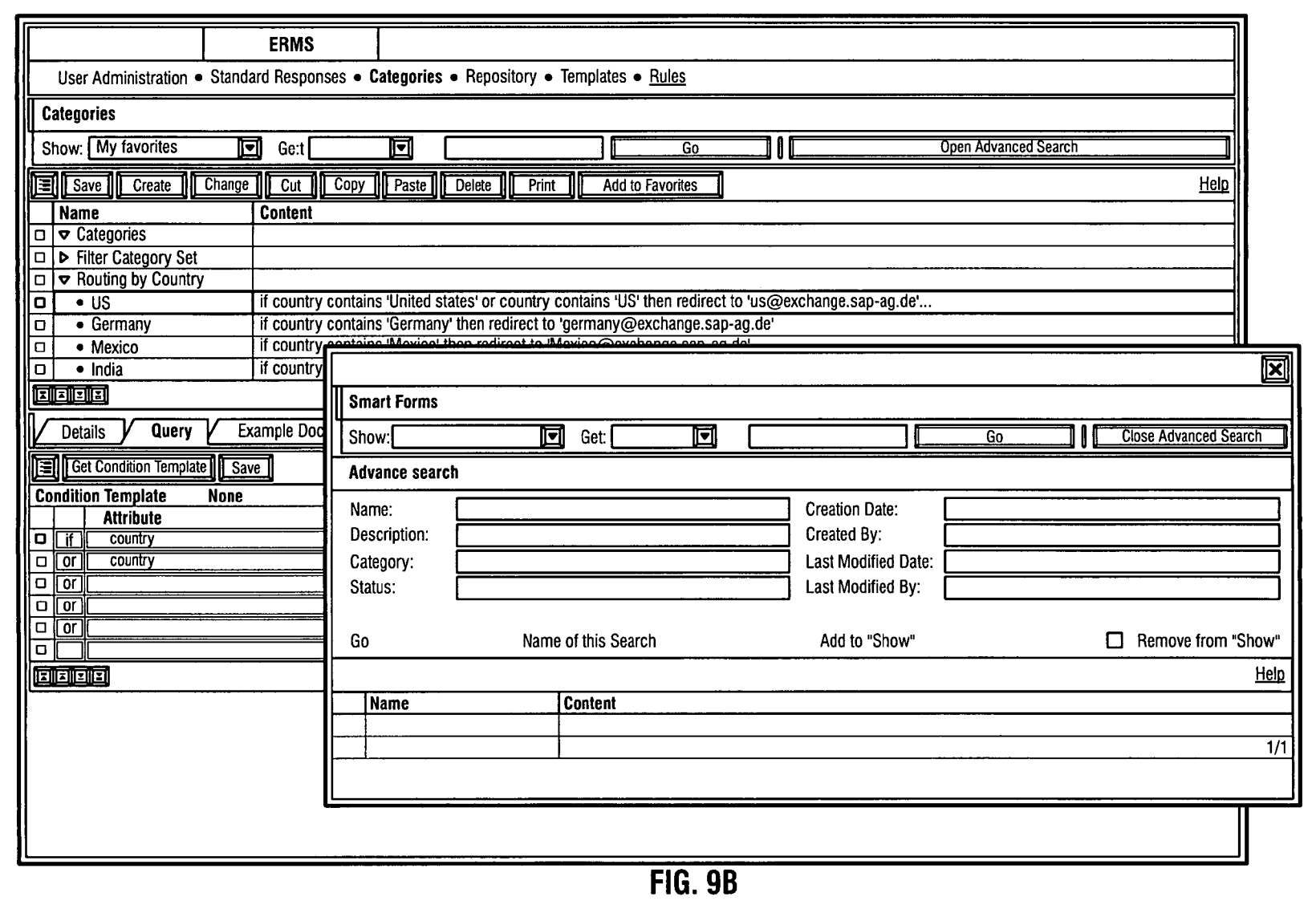

In the response template area 705, a first column 720 includes selectable boxes that serve as buttons for getting additional help screens. Specifically, selecting one of the buttons in the left margin of each row causes a value-help screen to pop-up. Once a value-help screen is popped-up, the user can perform searches, among other auxiliary functions. The pop-up is depicted in FIG. 9B.

A form name column 725 is used to enter, modify, and display the name of the response template 50 in each row. The user can delete a row by first selecting it and then selecting the delete entry button 730. The user can add a new row by selecting the add entry button 735. A description column 740 provides for entry, modification, and display of a description of the corresponding response template 50 in a selected row. A language column 745 provides an indication of the language used in the response template 50. In this example, all four rows indicate that the four associated response templates 50 are in the English language. Although four rows of response templates are shown in this example, additional rows, if any, can be displayed by scrolling using the scroll keys 750. Further details about each response template are illustrated by columns 755, 760, 765 and 770, which indicate, respectively, who created the template, when the template was created, what format the template is in, and the text type that is used for the template.

In the response preview window 710, the user can review, enter, and modify the text of the response template 50 linked to the highlighted response template 50 form name column 725. In this example, the selected response template 50 is "Directions-LEGOLAND® California" 715.

Figure 8:
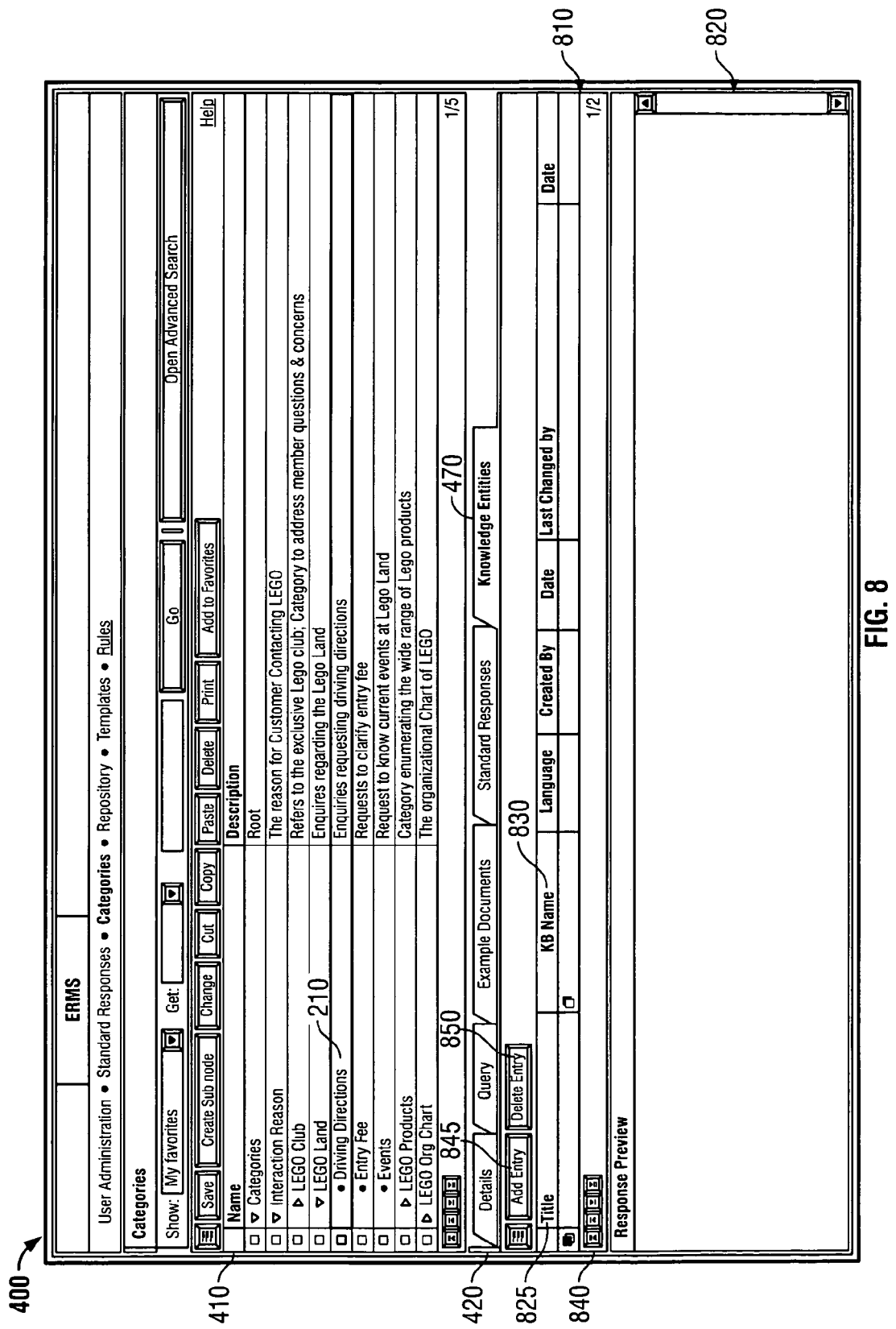

In FIG. 8, the knowledge entities viewset tab 470 is selected. In this example, user interface 400 is used to define links between the selected category 210 in the categorization area 410 and business objects, namely experts 46 and quick solutions 48, in the linking area 420. In alternative implementations, the linking area 420 could also provide a separate experts viewset tab (not shown) for defining links between a selected category and experts 46. When the knowledge entities tab 470 is selected, the linking area 420 displays a row 810 for linking business objects to a selected category, and a response preview area 820 for entering, modifying, and displaying a response template for use with the business object displayed in the row 810.

In this example, the selected driving directions category 210 can be linked to a document (i.e. a quick solution 48) stored in a knowledge base by entering the name (e.g., filename) of the document in a title column 825 in the row 810. In a "KB Name" column 830, the user can enter the name of a knowledge base in which the document identified in the title column 825 can be found. Alternatively, the KB Name column 830 may be automatically filled in when the document in the title column 825 is entered. Although only one row, namely the row 810, is shown in this example, a user can manipulate the scroll keys 840 to display other rows, if any. The user may also link additional documents to the driving directions category 210 by selecting the add entry button 845. The user may also select the delete entry button 850 to delete a link between a document and the driving directions category 210.

The row 810 provides additional information about the selected document identified in the title column 825. In this example, the additional information includes the language in which the document is written, the identity of the person who created the document, the date the document was created, the identity of the person who last changed the document, and the day on which they changed the document. The additional information about the selected document in column 825 may be entered either manually by the user, or automatically filled-in when the user selects a document. The additional information may be associated with the document in, for example, a database table defined in a knowledge base in which the document is stored.

In the response preview area 820, text for use in a response email may be prepared. The text of the response is associated with the document displayed in the row 810. For example, if a document is entered in the row 810, then when that document is attached to an email in the run-time environment 14, the associated text in the response preview area 820 may automatically be inserted into the reply email. In some examples, each document linked to the selected driving direction category 210 may have a different response text that is displayed in the preview area 820. For example, if the user selects the add entry button 845 and enters a second document in the title column 825, then the user may use the response preview window 820 to enter or modify a second response text that is associated with the second document.

Accordingly, FIGS. 4-8 illustrate examples in which the linking area 420 is used to directly enter, modify, and display information about categories in the categorization area 410. In FIGS. 9A-9B, the user interface 400 incorporates a search feature to enable the user to search for stored information within the enterprise computing system 10. In one example, the search features may be used to search for standard responses.

In FIG. 9A, the user interface 400 includes the categorization area 410, the linking area 420 (with the detailed viewset tab 450 selected) and an advanced search window 910. The user opens the advanced search window 910 by selecting the open advanced search button 490 (shown in FIG. 4). The open advanced search button 490 automatically changes to a close advanced search button 920 while the advanced search window 910 is open. If the user selects the close advanced search button 920, then the advanced search window 910 would be closed, and the user interface 400 would return to the configuration of FIG. 4.

In FIG. 9B, the user can search for standard responses using the "Smart Forms" pop-up screen.

The foregoing examples of FIGS. 4-9 illustrate functionality of the user interface 400 when a category in the categorization area 410 is selected. In FIG. 10, a categorization scheme is selected instead of a category. In this example, the interaction reason categorization scheme 135 is selected. When a categorization scheme is selected in the categorization area 410, the linking area 420 displays a details viewset tab 450. In this example, the details viewset tab 450 includes a general area 1005 and an application area 1010. The application area 1010 is only displayed when a categorization scheme is selected in the categorization area 410. With reference to FIG. 4, the general area 1005 provides the same information associating functions for a selected categorization scheme as the general area 472 (FIG. 4) provides for a selected category.

In the application area 1010, the interaction reason categorization scheme 135 is associated with several business process steps (also referred to as application areas). The associations are indicated by a check-marked box adjacent to the name of an available application area. In this example, the checked application areas include the interaction record business process step 120, more responses 1015, knowledge search 1020, and rules engines 1025. These associations have the effect that when any of these applications 120, 1015, 1020, 1025 are executed to perform their respective business process steps, the interaction reason categorization scheme 135 (or its current result) can be used. With reference to FIG. 3A, the interaction reason categorization scheme 135 is linked to the interaction record business process step 120 by the link 130. The link 130 is established when the user checks the box adjacent to the interaction record categorization label within the application area 1010.

Figure 11:
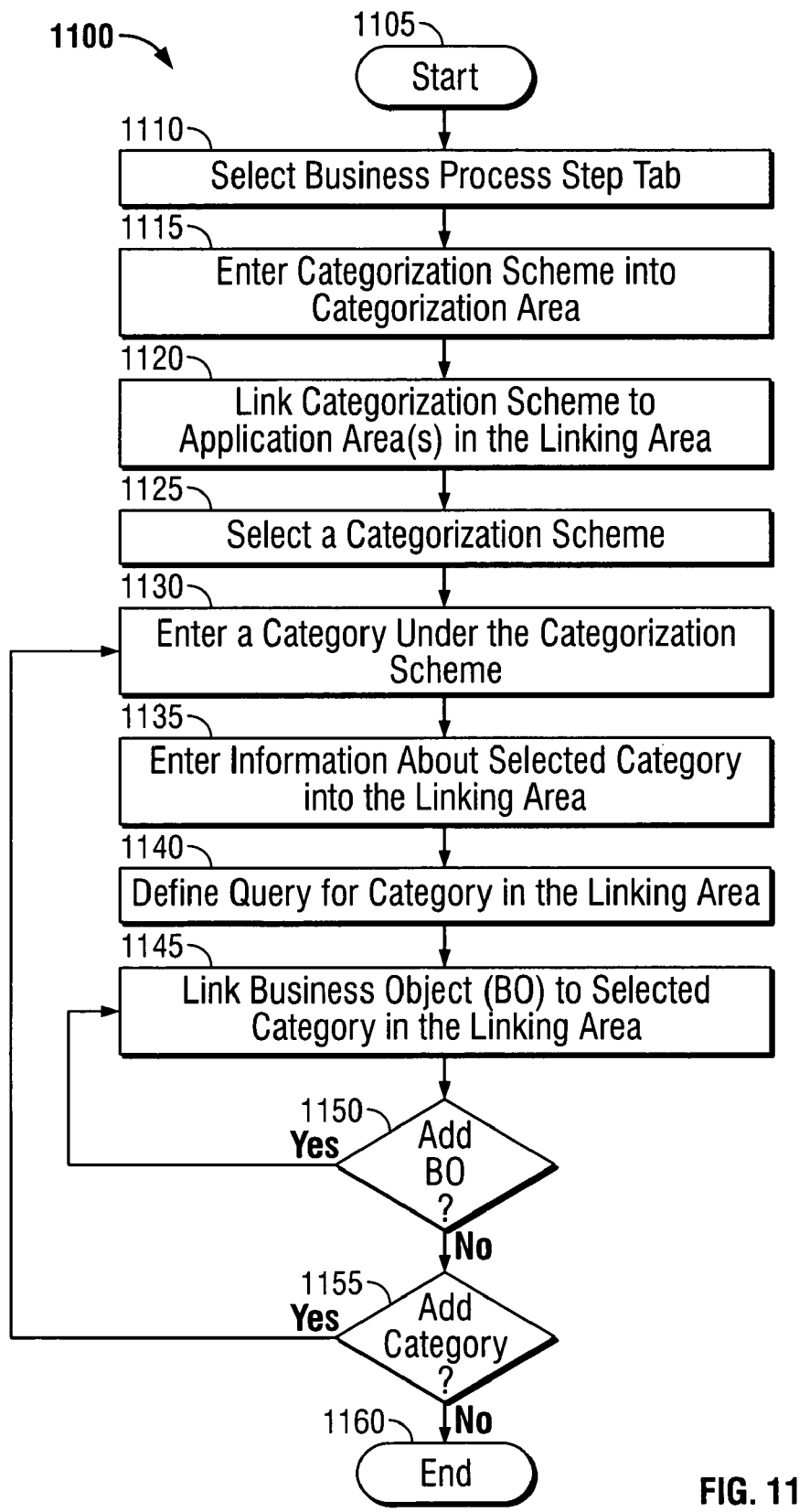
FIG. 11 is a flowchart of the steps to define a categorization scheme using the GUI of FIGS. 4-10.

In accordance with the foregoing discussion, the above-described user interface 400 can be used in the design-time environment 12 to create categorization schemes for use in the run-time environment 14. An exemplary procedure for using the user interface 400 to efficiently define a categorization scheme is presented in FIG. 11. The exemplary method will be described with reference to previous figures. Other implementations of the method may use different steps, or be performed in a different order to achieve similar results. The example of FIG. 11 merely illustrates one representative implementation of the invention. However, the user interface 400 is capable of being used in many different orders and combinations of steps.

A flow chart 1100 of the design-time procedure to create a categorization scheme starts at 1105. At 1110, the user selects a business process tab (e.g., ERMS tab 125 in FIG. 4). At 1115, the user enters a categorization scheme into the name column 425 of the categorization area 410 (FIG. 4). With the categorization scheme highlighted, the user links at 1120 the categorization scheme to one or more application areas, the application area 1010 (FIG. 10). At 1125, the user selects a categorization scheme in the categorization area 410 (FIG. 4). At 1130, the user enters a category under the selected categorization scheme by, for example, selecting the create sub-node button 437 and entering a category into the name column 425 of the categorization area 410 (FIG. 4). At 1135, the user enters information about the selected category into general area 472 (FIG. 4). At 1140, the user defines a query under the query tab 455 that, if evaluated as true in the run-time environment 14, causes the associated category to be selected. At 1145, the user links a business object to the selected category by, for example, identifying a document for attachment using the row 810 in the linking area 420 (FIG. 8).

The types of business objects that may be linked to the selected category include: experts 46 in a business partners tabstrip (not shown); quick solutions 48 in the knowledge entities view set tab 470 (FIG. 8); and, response templates 50 in the standard responses view set tab 465 (FIG. 7). As one of skill in the art will appreciate, viewset tabs on the user interface 400 may be added or modified to accommodate new types and uses of business objects.

At 1150, if the user wishes to add another business object to the selected category, the user can repeat the step at 1145 by, for example, selecting the add entry button 845 (FIG. 8). As another example at 1150, the user can select the standard responses tab 465 and add or modify response templates (which are a type of business object) using the add entry button 735, or by editing the response preview area 710, respectively (FIG. 7). If the user does not wish to add more business objects, then at 1155, the user can choose to add another category under the current categorization scheme by looping back to step at 1130. If no more categories need to be added, then the categorization creation process ends at 1160.

The foregoing exemplary method illustrates the entry of categories and the linking of business objects to create a categorization scheme. As can be appreciated, the method can be adapted as needed to use the user interface 400 to modify and to display the categorization scheme that has been entered. It can further be appreciated that the method can be used to enter, modify, and display more than one categorization scheme. Moreover, the method can be adapted so that the user interface 400 can be used to maintain existing categorization schemes over time. For example, the user interface 400 can be used to adapt the categories, linked business objects, and linked application areas to meet changing demands of the business processes as they evolve in the run-time environment 14.

Other Implementations

Although various examples of the user interface have been described, other implementations are also within the scope of the invention. For example, the categorization area 410 of FIG. 4 may be used to enter and modify a categorization scheme without a corresponding linking area 420.

Although FIG. 1 illustrates the enterprise computing system 10 as having one terminal 24 in the design-time environment 12 and another terminal 26 in the run-time environment 14, the two terminals 24, 26 may represent a single physical computer terminal or computer work station. Furthermore, the design-time environment 12 may include any number of terminals/work stations that can be used in combination to create run-time modules that use coherent categorization schemes. Similarly, the run-time environment 14 may include any number of terminals/work stations that can be used to perform business processes by executing run-time modules. As used in this document, terminals 24, 26 represent physical input/output devices for displaying and entering information in the enterprise computing system 10.

Other implementations may use configurations of the user interface 400 other than those provided in the above-described implementations. In FIG. 4, for example, the description text in the description column 430 may be provided in the name column 425 instead of being provided in an adjacent column.

As another exemplary configuration, the functionality provided by the create sub-node button 437 (FIG. 4), namely, creating a child category under a selected category, may be implemented using "promote" and "demote" buttons in the top area 435. Promote and demote buttons could, for example, incrementally shift the level of a selected category within the categorization scheme. Accordingly, links to the adjacent rows above and below the selected category could be adjusted accordingly to match the hierarchy's visual representation in the categorization area 410. Furthermore, "move up" and "move down" buttons could also be provided to further simplify the creation of a hierarchical categorization scheme by giving the developer the ability to move a selected item and re-position it within the name column 425.

The invention can also be implemented with digital electronic circuitry, or with computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention has been described in terms of particular examples. Other examples are within the scope of the following claims.

What is claimed is:

1. A computer program product tangibly embodied in a storage device, the computer-program product including instructions that, when executed, generate on a display device a graphical user interface (GUI) for configuring an electronic message response management system, the GUI comprising:

a categorization area that displays a categorization scheme for categorizing electronic messages received in an electronic message response management system and categorization controls for modifying the categorization scheme, the categorization scheme comprising a plurality of hierarchical categories, the hierarchical categories including a parent category and one or more child categories associated with the parent category or with another child category, the categorization controls comprising controls for at least one of creating a new category and modifying an existing category, wherein the categorization area displays one category as active;

a linking area comprising at least a first tabbed viewset, a second tabbed viewset and a third tabbed viewset, wherein the first tabbed viewset comprises user input fields for receiving input that characterizes a condition that, when met, associates a received electronic message with the active category, the second tabbed viewset comprises user input fields for receiving input that identifies one or more candidate response messages corresponding to the active category and provides a preview panel that displays at least one of the one or more candidate response messages corresponding to the active category, and the third tabbed viewset comprises user input fields for receiving input that associates the categorization scheme with a plurality of business processes that categorize received electronic messages.

2. The computer program product of claim 1, wherein the GUI displays user-selectable buttons that, when selected, enable information in the user-input fields to be edited using cut and paste functionality.

3. The computer program product of claim 1, wherein at least two of the plurality of associated business processes are configured to be executed using stored information determined to be linked to categories selected during a single categorization of the received electronic messages.

4. The computer program product of claim 1, wherein the categorization controls comprise selectable buttons which are configured to, upon selection, change a hierarchical level at which a category is defined.

5. The computer program product of claim 1, wherein the categorization controls comprise selectable buttons associated with each parent category, wherein each parent category is configured to be selectively displayed in an expanded form in which all child categories are graphically displayed, and selectively displayed in a collapsed form such that no child categories are graphically displayed.

6. The computer program product of claim 1, wherein the first tabbed viewset is displayed by default in the linking area, and wherein the second tabbed viewset is displayed in place of the first tabbed viewset upon receipt of user input selecting the second tabbed viewset.

7. The computer program product of claim 1, further comprising instructions that, when executed, cause a received electronic message to be classified according to the categorization scheme.

8. The computer program product of claim 7, wherein the received electronic message is classified according to the categorization scheme and associated, based on the classifying, with at least one category in the categorization scheme.

9. The computer program product of claim 7, further comprising instructions that, when executed, provide a candidate response message corresponding to the received electronic message.

* * * * *